US010955733B2

(12) United States Patent
Shimizu et al.

(10) Patent No.: US 10,955,733 B2
(45) Date of Patent: Mar. 23, 2021

(54) COOLING DEVICE AND PROJECTOR

(71) Applicant: SEIKO EPSON CORPORATION, Tokyo (JP)

(72) Inventors: Katsuya Shimizu, Matsumoto (JP); Norio Imaoka, Shimoina-gun Takamori-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/817,901

(22) Filed: Mar. 13, 2020

(65) Prior Publication Data
US 2020/0292926 A1 Sep. 17, 2020

(30) Foreign Application Priority Data

Mar. 14, 2019 (JP) .............................. JP2019-046948

(51) Int. Cl.
G03B 21/16 (2006.01)
H04N 9/31 (2006.01)
F28D 15/02 (2006.01)
G05D 23/19 (2006.01)
G03B 21/14 (2006.01)

(52) U.S. Cl.
CPC ............. G03B 21/16 (2013.01); F28D 15/02 (2013.01); G03B 21/145 (2013.01); G05D 23/19 (2013.01); H04N 9/3144 (2013.01)

(58) Field of Classification Search
CPC .... G03B 21/16; G03B 21/145; H04N 9/3144; F28D 15/02; F28D 15/0266
See application file for complete search history.

(56) References Cited

U.S. PATENT DOCUMENTS

2008/0135214 A1 6/2008 Ohsawa et al.
2015/0198869 A1* 7/2015 Kuriaki ................ G03B 21/005
353/31
2018/0164040 A1* 6/2018 Kusano ................ F28D 15/046

FOREIGN PATENT DOCUMENTS

| JP | 2005-300038 A | 10/2005 |
| JP | 2012-083082 A | 4/2012 |
| JP | 2014-114963 A | 6/2014 |
| JP | 2018-204882 A | 12/2018 |
| WO | 2007/026833 A1 | 3/2007 |

* cited by examiner

Primary Examiner — Ryan D Howard
(74) Attorney, Agent, or Firm — Oliff PLC

(57) ABSTRACT

A cooling device is provided with an evaporator, a condenser, a vapor pipe, and a liquid pipe. The evaporator includes a housing having a reservoir configured to retain a working fluid in a liquid phase flowing inside, a wick disposed in the housing, and transporting the working fluid in the liquid phase, and a groove member having a plurality of flow channels through which the working fluid changed in phase from the liquid phase to the gas phase flows, the groove member being coupled to the wick. The wick has a plurality of through holes which penetrate the wick along a first direction from the reservoir toward the groove member, the through holes being configured to transport the working fluid in the liquid phase retained in the reservoir in the first direction.

10 Claims, 13 Drawing Sheets

COOLING DEVICE AND PROJECTOR

The present application is based on, and claims priority from JP Application Serial Number 2019-046948, filed Mar. 14, 2019, the disclosure of which is hereby incorporated by reference herein in its entirety.

BACKGROUND

1. Technical Field

The present disclosure relates to a cooling device and a projector.

2. Related Art

In the past, as a cooling device used for cooling electronic equipment and so on, there has been known a loop heat pipe for transporting heat of a heat generator to thereby cool the heat generator using a change in phase of a working fluid encapsulated inside (see, e.g., JP-A-2012-83082 (Document 1)).

The loop heat pipe described in Document 1 is provided with an evaporator, a condenser, a vapor pipe, and a liquid pipe. The evaporator evaporates the working fluid in the liquid phase with the heat of the heat generator. The vapor pipe makes the working fluid having changed in phase from the liquid phase to the gas phase in the evaporator flow through the condenser. The condenser condenses the working fluid in the gas phase due to heat radiation to perform a phase change from the working fluid in the gas phase to the working fluid in the liquid phase. The liquid pipe makes the working fluid having changed in phase to the liquid phase in the condenser flow through the evaporator.

As described above, by the working fluid circulating in the loop heat pipe to transport the heat of the heat generator from the evaporator to the condenser and radiate the heat in the condenser, the heat generator is cooled.

It should be noted that in the loop heat pipe described in Document 1, the evaporator has a wick of a flat plate type, a groove disposed below the wick to form a vapor flow channel, and a housing for housing the wick and the groove member, and the heat generator is coupled to the housing.

The wick is formed of a porous material. A large number of small holes are disposed inside the wick, and the large number of small holes are communicated from the liquid reservoir section side to the vapor flow channel side. The working fluid in the liquid phase soaks into the large number of small holes from the liquid reservoir section inside the housing due to a capillary action. The working fluid in the liquid phase having soaked into the large number of small holes evaporates due to the heat transferred from the heat generator to change to the working fluid in the gas phase, and the working fluid in the gas phase flows through the vapor flow channel in the groove, and then flows into the vapor pipe.

The wick provided to the loop heat pipe described in Document 1 is a wick constituted by the porous material, and having the plurality of small holes (voids) inside as described above. In such a wick, the working fluid in the liquid phase is transported toward the groove member side while moving back and forth through each of the small holes in a direction crossing a direction from the wick toward the groove member. The maximum capillary force of such a wick can be increased by, for example, reducing the size of a particle constituting the wick to reduce the void diameter.

However, when the void diameter is small, the permeability of the working fluid in the liquid phase in the wick decreases to increase the pressure loss occurring when the working fluid passes through the wick.

In the wick as the porous body, there is a paradoxical relation between the maximum capillary force and the pressure loss as described above, there is a problem that it is difficult to increase the transportation efficiency of the working fluid in the liquid phase.

In view of this fact, there has been demanded a configuration of the wick capable of efficiently transporting the working fluid in the liquid phase toward the groove member side to thereby increase the cooling efficiency of the cooling target.

SUMMARY

A cooling device according to a first aspect of the present disclosure includes an evaporator configured to evaporate a working fluid in a liquid phase with a heat transferred from a cooling target to change the working fluid in the liquid phase to the working fluid in a gas phase, a condenser configured to condense the working fluid in the gas phase to change the working fluid in the gas phase to the working fluid in the liquid phase, a vapor pipe configured to circulate the working fluid changed in phase from the liquid phase to the gas phase in the evaporator into the condenser, and a liquid pipe configured to circulate the working fluid changed in phase from the gas phase to the liquid phase in the condenser into the evaporator, wherein the evaporator includes a housing coupled to the liquid pipe, and having a reservoir configured to retain the working fluid in the liquid phase flowed inside, a wick disposed in the housing, soaked with the working fluid in the liquid phase, and configured to transport the working fluid in the liquid phase, and a groove member having a plurality of flow channels through which the working fluid changed in phase from the liquid phase to the gas phase flows, the groove member being coupled to the wick, and the wick has a plurality of through holes penetrating the wick along a first direction from the reservoir toward the groove member, the through holes being configured to transport the working fluid in the liquid phase retained in the reservoir in the first direction.

In the first aspect described above, the wick may include a first layer having the plurality of through holes, and a second layer located between the first layer and the groove member, and a void ratio of the second layer may be higher than a void ratio of the first layer.

In the first aspect described above, a thermal conductivity of the second layer may be higher than a thermal conductivity of the first layer.

In the first aspect described above, the wick may be disposed so as to have contact with the groove member, and one of the wick and the groove member may have a protruding part configured to form a gap with another of the wick and the groove member, the gap being configured to communicate the plurality of through holes and the plurality of flow channels with each other.

A cooling device according to a second aspect of the present disclosure includes an evaporator configured to evaporate a working fluid in a liquid phase with a heat transferred from a cooling target to change the working fluid in the liquid phase to the working fluid in a gas phase, a condenser configured to condense the working fluid in the gas phase to change the working fluid in the gas phase to the working fluid in the liquid phase, a vapor pipe configured to circulate the working fluid changed in phase from the liquid phase to the gas phase in the evaporator into the condenser, and a liquid pipe configured to circulate the working fluid changed in phase from the gas phase to the liquid phase in the condenser into the evaporator, wherein the evaporator includes a housing coupled to the liquid pipe, and having a reservoir configured to retain the working fluid in the liquid phase flowed inside, and a heat exchanger configured to evaporate the working fluid in the liquid phase supplied from the reservoir, the heat exchanger has a fluid transport layer and a flow channel forming layer disposed in sequence along a first direction from the reservoir toward the heat exchanger, the flow channel forming layer coupled to the fluid transport layer, and having a plurality of flow channels through which the working fluid changed in phase from the liquid phase to the gas phase flows the plurality of flow channels being communicated with the vapor pipe, and the fluid transport layer has a plurality of through holes penetrating the fluid transport layer along the first direction and transporting the working fluid in the liquid phase retained in the reservoir in the first direction.

In the second aspect of the present disclosure, the fluid transport layer may include a first layer having the plurality of through holes, and a second layer located between the first layer and the flow channel forming layer, and a void ratio of the second layer may be higher than a void ratio of the first layer.

In the second aspect of the present disclosure, a thermal conductivity of the second layer may be higher than a thermal conductivity of the first layer.

In the second aspect of the present disclosure, the fluid transport layer is disposed so as to have contact with the flow channel forming layer, and one of the fluid transport layer and the flow channel forming layer may have a protruding part configured to form a gap with another of the fluid transport layer and the flow channel forming layer, the gap being configured to communicate the plurality of through holes and the plurality of flow channels with each other.

A projector according to a third aspect of the present disclosure includes a light source configured to emit light, a light modulator configured to modulate the light emitted from the light source, a projection optical device configured to project the light modulated by the light modulator, and anyone of the cooling devices described above.

In the third aspect described above, the cooling target may be the light source.

DESCRIPTION OF EXEMPLARY EMBODIMENTS

First Embodiment

Figure 1:
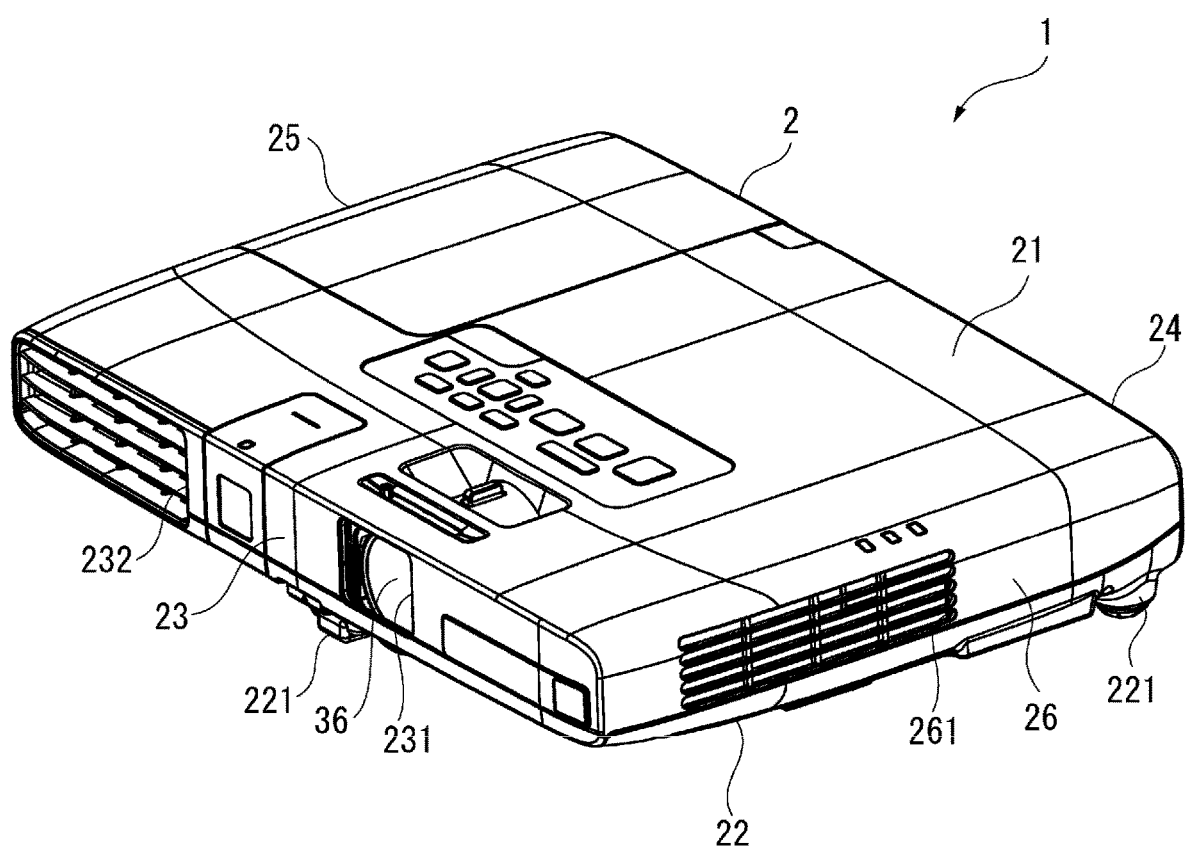
FIG. 1 is a perspective view showing an external appearance of a projector according to a first embodiment.

A first embodiment of the present disclosure will hereinafter be described based on the drawings.
Schematic Configuration of Projector FIG. 1 is a perspective view showing an external appearance of a projector 1 according to the present embodiment.

The projector 1 according to the present embodiment is an image display device for modulating the light emitted from a light source device 4 described later to form an image corresponding to image information, and then projecting the image thus formed on a projection target surface such as a screen in an enlarged manner. As shown in FIG. 1, the projector 1 is provided with an exterior housing 2 constituting an exterior of the projector 1.
Configuration of Exterior Housing The exterior housing 2 has a top surface part 21, a bottom surface part 22, a front surface part 23, a back surface part 24, a left side surface part 25, and a right side surface part 26, and is formed to have a substantially rectangular solid shape.

The bottom surface part 22 has a plurality of leg parts 221 having contact with an installation surface on which the projector 1 is mounted.

The front surface part 23 is located on the image projection side in the exterior housing 2. The front surface part 23 has an opening part 231 for exposing a part of a projection optical device 36 described later, and the image to be projected by the projection optical device 36 passes through the opening part 231. Further, the front surface part 23 has an exhaust port 232 from which a cooling gas having cooled the cooling target in the projector 1 is discharged to the outside of the exterior housing 2.

The right side surface part 26 has an introduction port 261 from which a gas such as air located outside the exterior housing 2 is introduced inside as the cooling gas.
Internal Configuration of Projector FIG. 2 is a schematic diagram showing an internal configuration of the projector 1.

Figure 2:
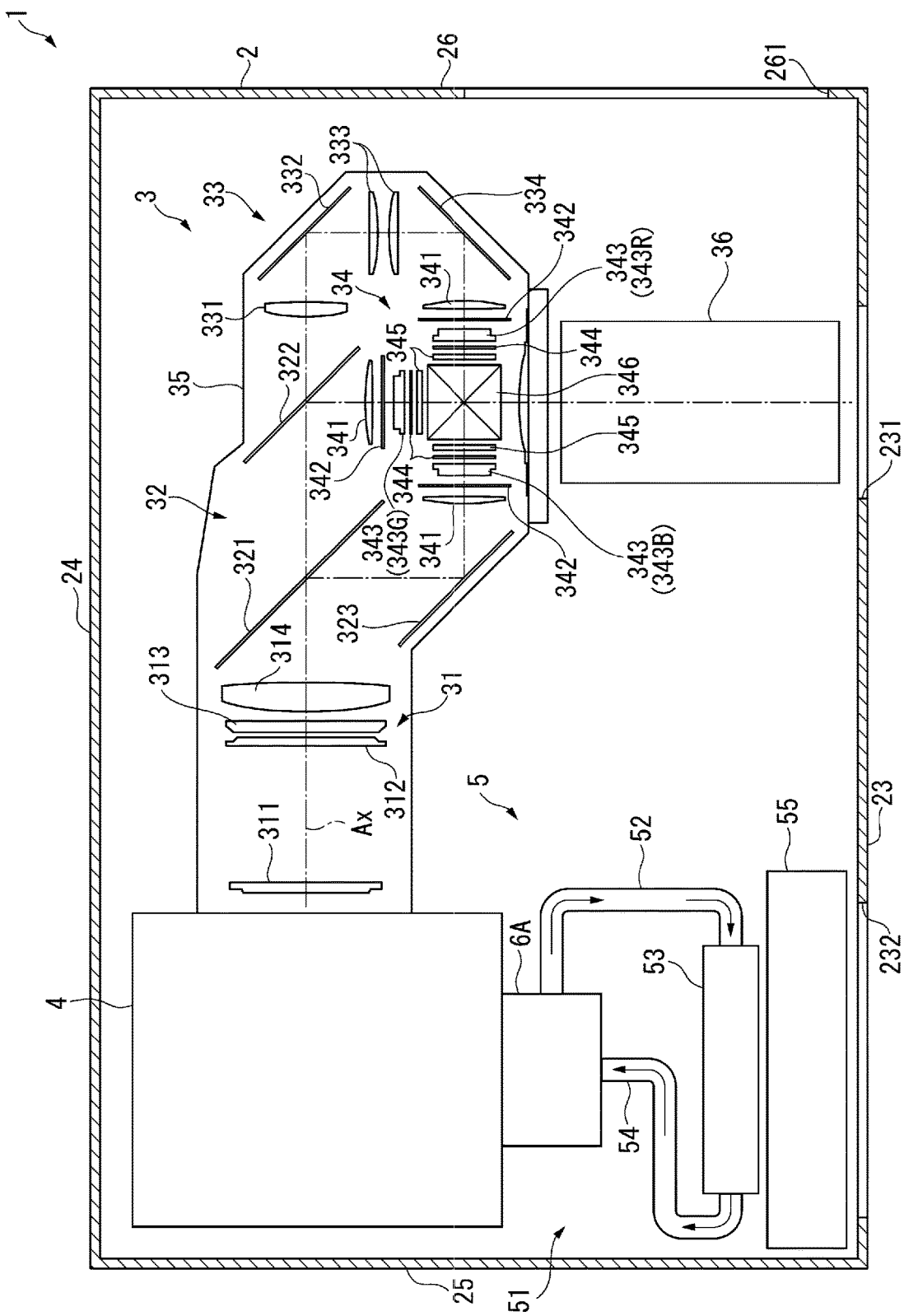
FIG. 2 is a schematic diagram showing an internal configuration of the projector according to the first embodiment.

As shown in FIG. 2, the projector 1 is further provided with an image projection device 3 and a cooling device 5 each housed inside the exterior housing 2. Besides the above, although not shown in the drawing, the projector 1 is provided with a control device for controlling an operation of the projector 1, and a power supply device for supplying electronic components of the projector 1 with electrical power.

Configuration of Image Projection Device

The image projection device 3 forms and then projects the image corresponding to the image information input from the control device. The image projection device 3 is provided with the light source device 4, a homogenizing device 31, a color separation device 32, a relay device 33, an image forming device 34, an optical component housing 35, and a projection optical device 36.

The light source device 4 emits illumination light. A configuration of the light source device 4 will be described later in detail.

The homogenizing device 31 homogenizes the illumination light emitted from the light source device 4. The illumination light thus homogenized illuminates modulation areas of light modulators 343 described later of the image forming device 34 via the color separation device 32 and the relay device 33. The homogenizing device 31 is provided with two lens arrays 311, 312, a polarization conversion element 313, and a superimposing lens 314.

The color separation device 32 separates the light having entered the color separation device 32 from the homogenizing device 31 into colored light beams of red, green, and blue. The color separation device 32 is provided with two dichroic mirrors 321, 322 and a reflecting mirror 323 for reflecting the blue light beam having been separated by the dichroic mirror 321.

The relay device 33 is disposed on a light path of the red light beam longer than light paths of other colored light beams to suppress a loss of the red light beam. The relay device 33 is provided with an incident side lens 331, relay lenses 333, and reflecting mirrors 332, 334. It should be noted that in the present embodiment, it is assumed that the colored light beam longer in light path than other colored light beams is the red light beam, and the relay device 33 is disposed on the light path of the red light beam. However, this is not a limitation, and it is also possible to adopt a configuration in which, for example, the colored light beam longer in light path than other colored light beams is set as the blue light beam, and the relay device 33 is disposed on the light path of the blue light beam.

The image forming device 34 modulates each of the colored light beams of red, green, and blue having entered the image forming device 34, and combines the colored light beams thus modulated with each other to form the image. The image forming device 34 is provided with three field lenses 341, three incident side polarization plates 342, three light modulators 343, three view angle compensation plates 344 and three exit side polarization plates 345 each disposed in accordance with the respective colored light beams entering the image forming device 34, and a single color combining device 346.

The light modulators 343 each modulate the light emitted from the light source device 4 in accordance with the image information. The light modulators 343 include a light modulator 343R for the red light beam, a light modulator 343G for the green light beam, and a light modulator 343B for the blue light beam. In the present embodiment, the light modulators 343 are each formed of a transmissive liquid crystal panel, and the incident side polarization plate 342, the light modulator 343, and the exit side polarization plate 345 constitute a liquid crystal light valve.

The color combining device 346 combines the colored light beams respectively modulated by the light modulators 343B, 343G, and 343R with each other to form the image.

In the present embodiment, the color combining device 346 is formed of a cross dichroic prism, but this is not a limitation, and it is also possible for the color combining device 346 to be constituted by, for example, a plurality of dichroic mirrors.

The optical component housing 35 houses the devices 31 through 34 described above inside. It should be noted that an illumination light axis Ax as a design optical axis is set in the image projection device 3, and the optical component housing 35 holds the devices 31 through 34 at predetermined positions on the illumination light axis Ax. It should be noted that the light source device 4 and the projection optical device 36 are disposed at predetermined positions on the illumination light axis Ax.

The projection optical device 36 projects the image having entered the projection optical device 36 from the image forming device 34 on the projection target surface in an enlarged manner. In other words, the projection optical device 36 projects the light beams having respectively been modulated by the light modulators 343B, 343G, and 343R. The projection optical device 36 is configured as a combination lens having, for example, a plurality of lenses housed in a lens tube having a cylindrical shape.

Configuration of Light Source Device

Figure 3:
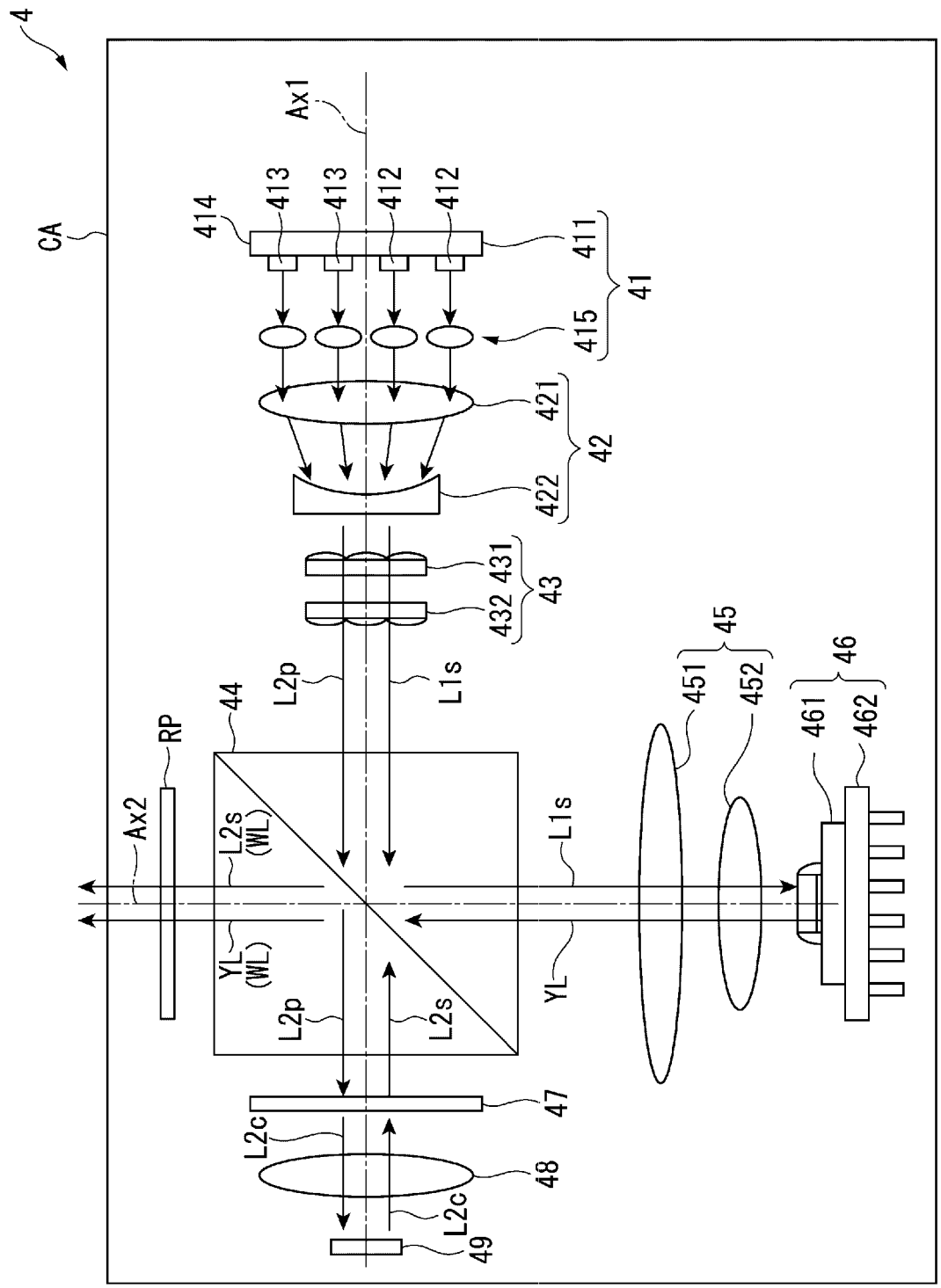
FIG. 3 is a schematic diagram showing a configuration of a light source device in the first embodiment.

FIG. 3 is a schematic diagram showing a configuration of the light source device 4.

The light source device 4 emits the illumination light to the homogenizing device 31. As shown in FIG. 3, the light source device 4 is provided with a light source housing CA, and a light source section 41, an afocal optical element 42, a homogenizer optical element 43, a polarization split element 44, a first light collection element 45, a wavelength conversion element 46, a first retardation element 47, a second light collection element 48, a diffusely reflecting device 49, and a second retardation element RP each housed inside the light source housing CA.

The light source housing CA is configured as a sealed housing difficult for dust or the like to enter the inside thereof.

The light source section 41, the afocal optical element 42, the homogenizer optical element 43, the polarization split element 44, the first retardation element 47, the second light collection element 48, and the diffusely reflecting device 49 are arranged on an illumination light axis Ax1 set in the light source device 4.

The wavelength conversion element 46, the first light collection element 45, the polarization split element 44, and the second retardation element RP are set in the light source device 4, and are arranged on an illumination light axis Ax2 perpendicular to the illumination light axis Ax1. The illumination light axis Ax2 coincides with the illumination light axis Ax at the position of the lens array 311. In other words, the illumination light axis Ax2 is set on an extended line of the illumination light axis Ax.

Configuration of Light Source Section

The light source section 41 is provided with a light source 411 for emitting the light, and collimator lenses 415.

The light source 411 is provided with a plurality of first semiconductor lasers 412 and a plurality of second semiconductor lasers 413, and a support member 414.

The first semiconductor lasers 412 each emit blue light L1s, which is s-polarized light, as excitation light. The blue light L1s is, for example, a laser beam with a peak wavelength of 440 nm. The blue light L1s having been emitted from the first semiconductor lasers 412 enters the wavelength conversion element 46.

The second semiconductor lasers 413 each emit blue light L2p, which is p-polarized light. The blue light L2p is, for example, a laser beam with a peak wavelength of 460 nm. The blue light L2p having been emitted from the second semiconductor lasers 413 enters the diffusely reflecting device 49.

The support member 414 supports the plurality of first semiconductor lasers 412 and the plurality of second semiconductor lasers 413 each arranged in an array in a plane perpendicular to the illumination light axis Ax1. The support member 414 is a member made of metal having thermal conductivity, and is coupled to an evaporator 6A described later. Then, the heat of each of the semiconductor lasers 412, 413, namely the heat of the light source 411, as a heat source is transferred to the evaporator 6A.

The blue light L1s having been emitted from the first semiconductor lasers 412 and the blue light L2p having been emitted from the second semiconductor lasers 413 are converted by the collimator lenses 415 into parallel light beams, and then enter the afocal optical element 42.

It should be noted that in the present embodiment, the light source 411 has a configuration of emitting the blue light L1s as the s-polarized light and the blue light L2p as the p-polarized light. However, this is not a limitation, and the light source 411 can also be provided with a configuration of emitting blue light beams which are linearly polarized light beams the same in polarization direction. In this case, it is sufficient to dispose a retardation element which changes one type of linearly polarized light having entered the retardation element to light including s-polarized light and p-polarized light between the light source section 41 and the polarization split element 44.

Configuration of Afocal Optical Element and Homogenizer Optical Element

The afocal optical element 42 adjusts the beam diameter of the blue light L1s, L2p which enters the afocal optical element 42 from the light source section 41, and then makes the blue light L1s, L2p enter the homogenizer optical element 43. The afocal optical element 42 is constituted by a lens 421 for collecting the incident light, and a lens 422 for collimating the light beam collected by the lens 421.

The homogenizer optical element 43 homogenizes the illuminance distribution of the blue light L1s, L2p. The homogenizer optical element 43 is formed of a pair of multi-lens arrays 431, 432.

Configuration of Polarization Split Element

The blue light L1s, L2p having passed through the homogenizer optical element 43 enters the polarization split element 44.

The polarization split element 44 is a prism-type polarization beam splitter, and separates an s-polarization component and a p-polarization component included in the incident light from each other. Specifically, the polarization split element 44 reflects the s-polarization component, and transmits the p-polarization component. Further, the polarization split element 44 has a color separation characteristic of transmitting light with the wavelength no shorter than a predetermined wavelength irrespective of whether the light is the s-polarization component or the p-polarization component. Therefore, the blue light L1s as the s-polarized light is reflected by the polarization split element 44, and then enters the first light collection element 45. Meanwhile, the blue light L2p as the p-polarized light is transmitted through the polarization split element 44, and then enters the first retardation element 47.

Configuration of First Light Collection Element

The first light collection element 45 converges the blue light L1s having been reflected by the polarization split element 44 on the wavelength conversion element 46. Further, the first light collection element 45 collimates fluorescence YL entering the first light collection element 45 from the wavelength conversion element 46. Although the first light collection element 45 is constituted by two lenses 451, 452 in the example shown in FIG. 3, the number of the lenses constituting the first light collection element 45 does not matter.

Configuration of Wavelength Conversion Element

The wavelength conversion element 46 is excited by the incident light to generate the fluorescence YL longer in wavelength than the incident light, and emits the fluorescence YL to the first light collection element 45. In other words, the wavelength conversion element 46 converts the wavelength of the incident light, and then emits the light thus converted. The fluorescence YL generated by the wavelength conversion element 46 is, for example, light with the peak wavelength in a range of 500 through 700 nm. The wavelength conversion element 46 is provided with a wavelength converter 461 and a heat radiator 462.

Although not shown in the drawing, the wavelength converter 461 has a wavelength conversion layer and a reflecting layer. The wavelength conversion layer includes a phosphor for diffusely emitting the fluorescence YL as non-polarized light obtained by performing the wavelength conversion on the blue light L1s entering the phosphor. The fluorescence YL entering the reflecting layer from the wavelength conversion layer is reflected by the reflecting layer toward the first light collection element 45.

The heat radiator 462 is disposed on a surface on an opposite side to the incident side of light in the wavelength converter 461 to radiate the heat generated in the wavelength converter 461.

The fluorescence YL having been emitted from the wavelength conversion element 46 passes through the first light collection element 45 along the illumination light axis Ax2, and then enters the polarization split element 44 having the color separation characteristic described above. Then, the fluorescence YL passes through the polarization split element 44 along the illumination light axis Ax2, and then enters the second retardation element RP.

It should be noted that the wavelength conversion element 46 can also be provided with a configuration of being rotated around a rotational axis parallel to the illumination light axis Ax2 by a rotation device such as a motor.

Configuration of First Retardation Element and Second Light Collection Element

The first retardation element 47 is disposed between the polarization split element 44 and the second light collection element 48. The first retardation element 47 converts the blue light L2p having passed through the polarization split element 44 into blue light L2c as circularly polarized light. The blue light L2c enters the second light collection element 48.

The second light collection element 48 converges the blue light L2c entering the second light collection element 48 from the first retardation element 47 on the diffusely reflecting device 49. Further, the second light collection element 48 collimates the blue light L2c entering the second light collection element 48 from the diffusely reflecting device 49. It should be noted that the number of lenses constituting the second light collection element 48 can arbitrarily be changed.

Configuration of Diffusely Reflecting Device

The diffusely reflecting device 49 diffusely reflects the blue light L2c which has entered the diffusely reflecting device 49, at substantially the same diffusion angle as that of the fluorescence YL generated in and emitted from the wavelength conversion element 46. As a configuration of the diffusely reflecting device 49, there can be illustrated a configuration provided with a reflecting plate for performing Lambertian reflection on the blue light L2c having entered the reflecting plate, and a rotation device for rotating the reflecting plate around a rotational axis parallel to the illumination light axis Ax1.

The blue light L2c having diffusely been reflected by the diffusely reflecting device 49 passes through the second light collection element 48, and then enters the first retardation element 47. The blue light L2c is converted into circularly polarized light with the opposite rotational direction when reflected by the diffusely reflecting device 49. Therefore, the blue light L2c having entered the first retardation element 47 via the second light collection element 48 is not converted into the blue light L2p as the p-polarized light at the moment when having entered the first retardation element 47 from the polarization split element 44, but is converted into the blue light L2s as the s-polarized light. Then, the blue light L2s is reflected by the polarization split element 44 to enter the second retardation element RP. Therefore, the light which enters the second retardation element RP from the polarization split element 44 is white light having the blue light L2s and the fluorescence YL mixed with each other.

Configuration of Second Retardation Element

The second retardation element RP converts the white light which enters the second retardation element RP from the polarization split element 44 into light having s-polarized light and p-polarized light mixed with each other. Illumination light WL as the white light converted in such a manner enters the homogenizing device 31 described above.

Configuration of Cooling Device

The cooling device 5 cools the cooling target constituting the projector 1. In the present embodiment, the cooling target is the light source 411 of the light source device 4. As shown in FIG. 2, the cooling device 5 is provided with a loop heat pipe 51 and a cooling fan 55.

The cooling fan 55 is disposed between the exhaust port 232 and a condenser 53 described later of the loop heat pipe 51 in the space inside the exterior housing 2. The cooling fan 55 makes cooling air flow through the condenser 53 in the process of suctioning the cooling air inside the exterior housing 2 to discharge the cooling air from the exhaust port 232, and thus, cools the condenser 53. It should be noted that it is also possible to adopt a configuration in which, for example, the cooling fan 55 is disposed between the introduction port 261 and the condenser 53 described later in the space inside the exterior housing 2, and suctions the cooling air located outside the exterior housing 2 to feed the cooling air to the condenser 53.

The loop heat pipe 51 has a circulation channel through which the working fluid circulates, wherein the working fluid is encapsulated in a reduced pressure state to thereby be changed in phase state at a relatively low temperature. In the detailed description, the loop heat pipe 51 causes the phase change of the phase state of the working fluid encapsulated inside the loop heat pipe 51 in the reduced pressure state from the liquid phase to the gas phase with the heat transferred from the cooling target to draw the heat from the working fluid in the gas phase in a region other than regions where the phase change of the working fluid from the liquid phase to the gas phase has occurred to thereby change the phase state of the working fluid from the gas phase to the liquid phase, and at the same time, radiates the heat thus drawn to thereby cool the cooling target.

Such a loop heat pipe 51 is provided with the evaporator 6A, a vapor pipe 52, the condenser 53, and a liquid pipe 54. It should be noted that a configuration of the evaporator 6A will be described later in detail.

Configuration of Vapor Pipe

The vapor pipe 52 is a tubular member for coupling the evaporator 6A and the condenser 53 to each other in the circulation channel of the working fluid so that the working fluid in the gas phase can flow. The vapor pipe 52 makes the working fluid which has changed in phase from the liquid phase to the gas phase in the evaporator 6A and then flows from the evaporator 6A into the vapor pipe 52, flow into the condenser 53.

Configuration of Condenser

The condenser 53 draws the heat of the working fluid in the gas phase and then radiates the heat, and thus, changes the working fluid in phase from the gas phase to the liquid phase, and then makes the working fluid in the liquid phase flow out to the liquid pipe 54. In other words, the condenser 53 condenses the working fluid in the gas phase to change the working fluid in the gas phase to the working fluid in the liquid phase. Although not shown in the drawings, the condenser 53 has a main body part to which the vapor pipe 52 and the liquid pipe 54 are coupled, and a heat radiator coupled to the main body part.

The main body part has a phase change flow channel inside, wherein the working fluid in the gas phase inflowing from the vapor pipe 52 flows through the phase change flow channel, and the phase change flow channel is communicated with the liquid pipe 54. The heat of the working fluid in the gas phase is received by the main body part and thus the working fluid is cooled in the process in which the working fluid in the gas phase flows through the phase change flow channel, and thus, the working fluid in the gas phase is changed to the working fluid in the liquid phase. Then, the working fluid having been changed in phase from the gas phase to the liquid phase further flows through the phase change flow channel, and cooled by the main body part which receives the heat of the working fluid in the liquid phase, and then flows out to the liquid pipe 54.

The heat radiator is a member for radiating the heat of the working fluid having been transferred to the main body part, and is a so-called heatsink. Through the heat radiator, the cooling gas flows due to the drive of the cooling fan 55, and thus, the condenser 53 is cooled.

Configuration of Liquid Pipe

The liquid pipe 54 is a tubular member for coupling the condenser 53 and the evaporator 6A to each other in the circulation channel of the working fluid so that the working fluid in the liquid phase can flow. The liquid pipe 54 makes the working fluid having changed in phase from the gas phase to the liquid phase in the condenser 53 flow into the evaporator 6A.

Configuration of Evaporator

The evaporator 6A is coupled to the light source 411 as the cooling target, evaporates the working fluid in the liquid phase with the heat transferred from the light source 411 to change the working fluid in the liquid phase to the working fluid in the gas phase. Specifically, the evaporator 6A is coupled to the support member 414 of the light source 411, and evaporates the working fluid in the liquid phase with the heat of the semiconductor lasers 412, 413 transferred via the support member 414 to thereby cool the semiconductor lasers 412, 413.

Figure 4:
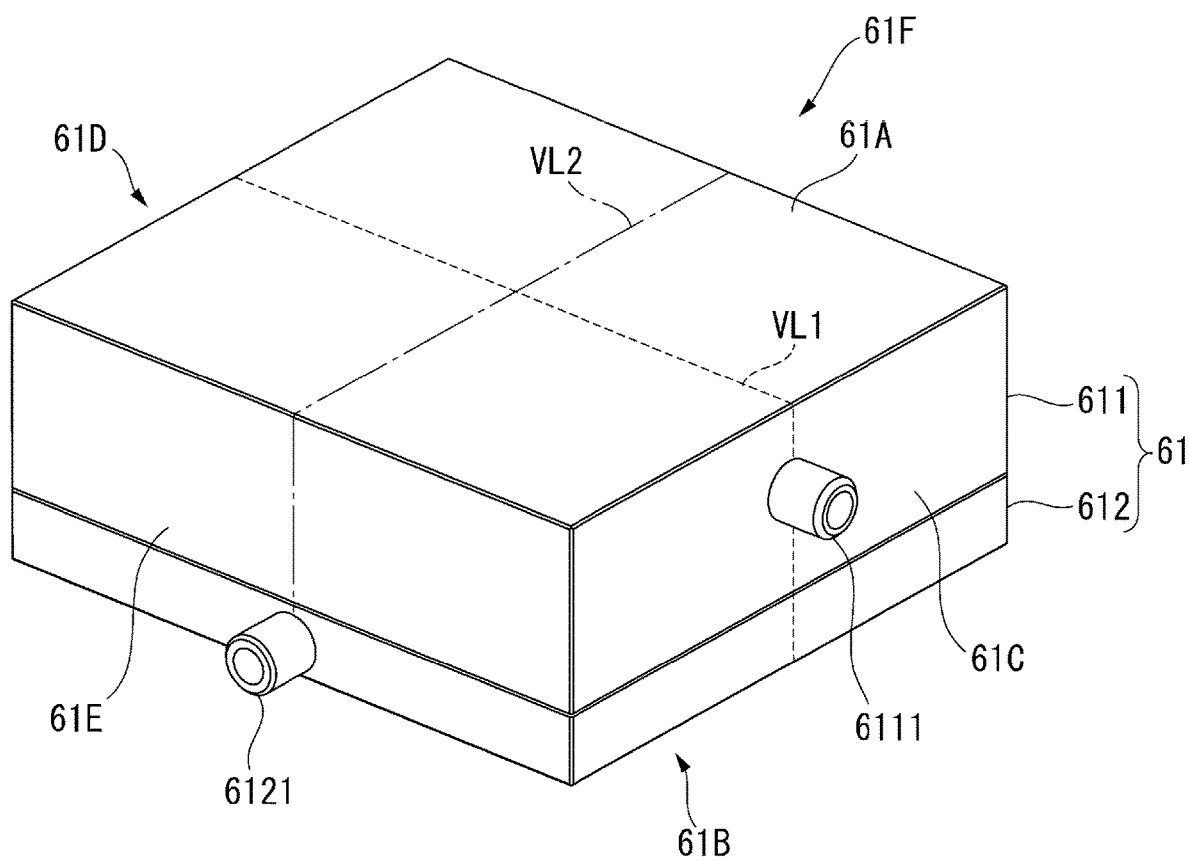
FIG. 4 is a perspective view showing an external appearance of an evaporator in the first embodiment.
Figure 5:
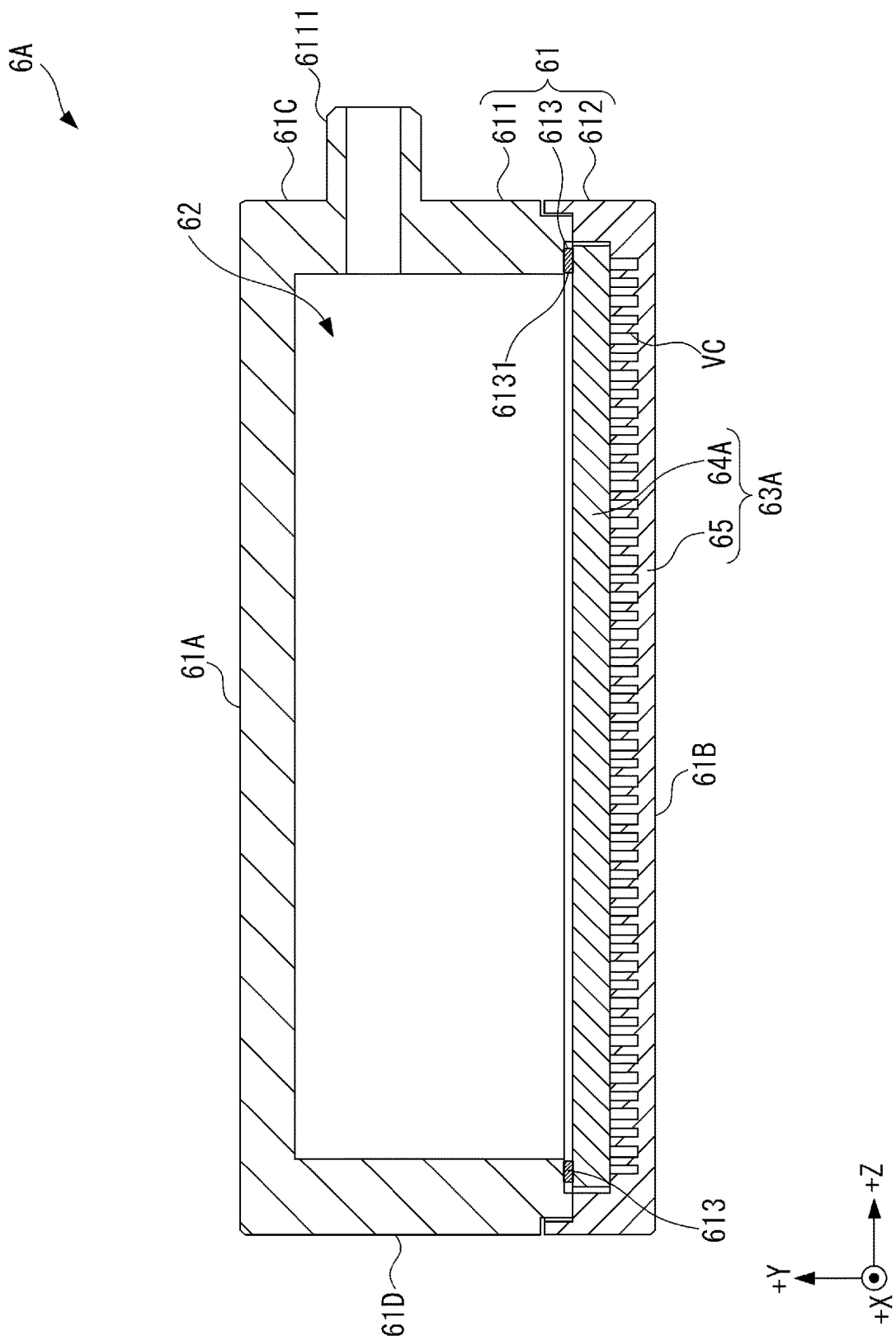
FIG. 5 is a cross-sectional view schematically showing an internal structure of the evaporator in the first embodiment.
Figure 6:
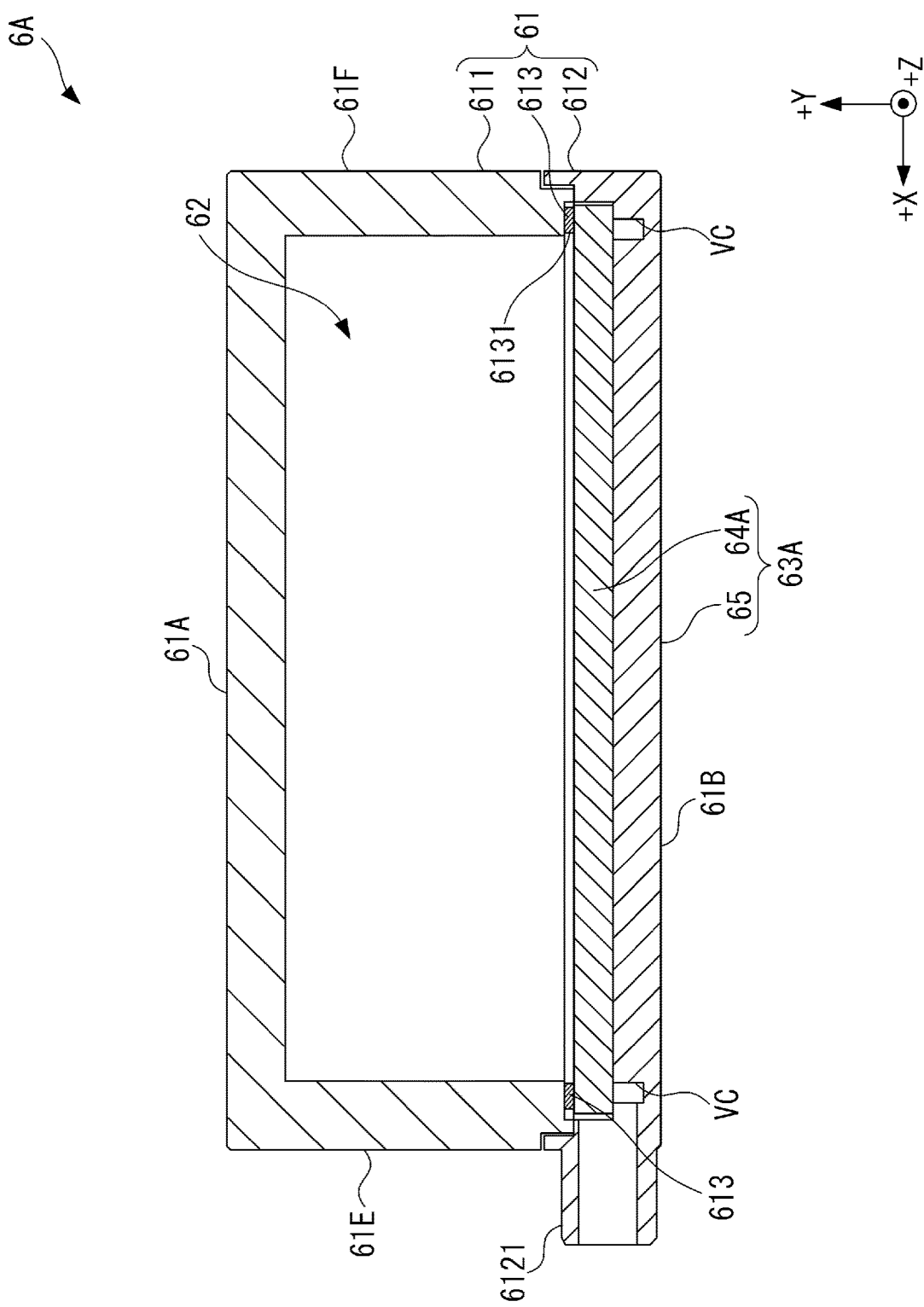
FIG. 6 is a cross-sectional view schematically showing an internal structure of the evaporator in the first embodiment.

FIG. 4 is a perspective view showing an external appearance of the evaporator 6A. Further, FIG. 5 and FIG. 6 are each a cross-sectional view schematically showing an internal structure of the evaporator 6A. Specifically, FIG. is a diagram showing a cross-sectional surface of the evaporator 6A including an imaginary line VL1 represented by the dotted line in FIG. 4, and FIG. 6 is a diagram showing a cross-sectional surface of the evaporator 6A including an imaginary line VL2 represented by the dashed-dotted line in FIG. 4. In other words, the cross-sectional surface of the evaporator 6A shown in FIG. 5 and the cross-sectional surface of the evaporator 6A shown in FIG. 6 are perpendicular to each other. It should be noted that in FIG. 5, some flow channels VC out of a plurality of flow channels VC are denoted by the reference symbol taking eye-friendliness into consideration.

The evaporator 6A is provided with a housing 61 as shown in FIG. 4 through FIG. 6, and is further provided with a reservoir 62 and a heat exchanger 63A as shown in FIG. 5 and FIG. 6.

Configuration of Housing

The housing 61 has a first housing 611 and a second housing 612 each formed of metal, and further has a sealing member 613 as shown in FIG. 5 and FIG. 6. By the first housing 611 and the second housing 612 being combined with each other in the state in which the sealing member 613 is disposed inside, the housing 61 is formed to have a rectangular solid shape as a whole. As shown in FIG. 4, such a housing 61 has a top surface part 61A, a bottom surface part 61B, and side surface parts 61C through 61F.

The top surface part 61A and the bottom surface part 61B are regions located on the sides opposite to each other in the housing 61.

The side surface part 61C and the side surface part 61D are regions located on the sides opposite to each other in the housing 61. Further, the side surface part 61E and the side surface part 61F are regions located on the sides opposite to each other in the housing 61. In other words, when viewing the housing 61 so that the top surface part 61A is located on the upper side, and the bottom surface part 61B is located on the lower side setting the side surface part 61C as the front surface part of the housing 61, the side surface part 61D corresponds to the back surface part of the housing 61, the side surface part 61E corresponds to the left side surface part of the housing 61, and the side surface part 61F corresponds to the right side surface part of the housing 61.

The bottom surface part 61B is coupled to the light source 411 as the cooling target of the loop heat pipe 51 so as to be able to transfer heat to each other. Further, the heat of the light source 411 is transferred to the bottom surface part 61B, by extension, to the second housing 612. It should be noted that a heat receiving member for transferring the heat received from the light source 411 to the bottom surface part 61B can be disposed between the bottom surface part 61B and the light source 411.

In the following description, three directions perpendicular to each other are defined as a +X direction, a +Y direction, and a +Z direction, respectively. Further, the +X direction is defined as a direction from the side surface part 61F toward the side surface part 61E, the +Y direction is defined as a direction from the bottom surface part 61B toward the top surface part 61A, and the +Z direction is defined as a direction from the side surface part 61D toward the side surface part 61C.

Further, although not shown in the drawings, an opposite direction to the +X direction is defined as a −X direction, an opposite direction to the +Y direction is defined as a −Y direction, and an opposite direction to the +Z direction is defined as a −Z direction for the sake of convenience of explanation.

As shown in FIG. 4 through FIG. 6, the first housing 611 forms the top surface part 61A and the regions on the +Y direction side of the side surface parts 61C through 61F. The inside space in the first housing 611 forms the reservoir 62 when combined with the second housing 612. In other words, the first housing 611 is provided with the reservoir 62.

The first housing 611 has a liquid pipe coupler 6111 projecting in the +Z direction to be coupled to the liquid pipe 54. The liquid pipe coupler 6111 is communicated with the inside of the first housing 611, and the working fluid in the liquid phase flowing through the liquid pipe 54 inflows into the first housing 611 via the liquid pipe coupler 6111.

The second housing 612 forms the bottom surface part 61B and the regions on the −Y direction side of the side surface parts 61C through 61F. Inside the second housing 612, there is disposed a wick 64A as a fluid transport layer in the heat exchanger 63A, and in addition, there are formed the plurality of flow channels VC constituting a groove member 65 as a flow channel forming layer in the heat exchanger 63A. In other words, the second housing 612 and the groove member 65 are integrated with each other, and in the second housing 612, there is disposed the heat exchanger 63A including the wick 64A and the groove member 65.

The second housing 612 has a vapor pipe coupler 6121 projecting in the +X direction to be coupled to the vapor pipe 52. The vapor pipe coupler 6121 is communicated with the plurality of flow channels VC formed inside the second housing 612, and the working fluid in the gas phase flowing through the plurality of flow channels VC inflows into the vapor pipe 52 via the vapor pipe coupler 6121 although described later in detail.

As shown in FIG. 5 and FIG. 6, the sealing member 613 seals a space between the first housing 611 and the second housing 612 to prevent the leakage of the working fluid to the outside of the housing 61. The sealing member 613 is a ring-like member corresponding to the outside diameter shape of the wick 64A described later, and at the center of the sealing member 613, there is formed a hole part 6131 for allowing the working fluid in the liquid phase retained in the reservoir 62 to have contact with the surface on the +Y direction side of the wick 64A. Further, when viewing the sealing member 613 from the +Y direction, the sealing member 613 is arranged so that the center of the sealing member 613 substantially coincides with the center of the wick 64A, and the outer edge of the sealing member 613 is located on the inner side of the outer edge of the wick 64A.

The sealing member 613 is installed between the first housing 611 and the second housing 612 so as to be disposed on the +Y direction side with respect to the wick 64A disposed inside the second housing 612, and to be coupled to the first housing 611 and the wick 64A.

Configuration of Reservoir

The reservoir 62 is formed inside the first housing 611 by the first housing 611 and the second housing 612 combined with each other as shown in FIG. 5 and FIG. 6. The reservoir 62 retains the working fluid in the liquid phase flowing into the housing 61 via the liquid pipe 54. In other words, the reservoir 62 is a region in which the working fluid in the liquid phase having failed to be suctioned by the wick 64A is retained inside the housing 61.

Configuration of Heat Exchanger

The heat exchanger 63A is provided to the second housing 612. The heat exchanger 63A evaporates the working fluid in the liquid phase supplied from the reservoir 62 with the heat transferred from the light source 411 as the cooling target to generate the vapor as the working fluid having changed in phase from the liquid phase to the gas phase, and then discharges the vapor thus generated to the vapor pipe 52.

The heat exchanger 63A has the wick 64A as the fluid transport layer, and the groove member 65 as the flow channel forming layer. In other words, the evaporator 6A has the wick 64A and the groove member 65 constituting the heat exchanger 63A. In the detailed description, the heat exchanger 63A has the wick 64A as the fluid transport layer and the groove member 65 as the flow channel forming layer disposed in sequence toward the −Y direction as a first direction from the reservoir 62 toward the heat exchanger 63A.

Configuration of Wick

The wick 64A is disposed inside the second housing 612 so as to have contact with the working fluid in the liquid phase retained in the reservoir 62, and then transports the working fluid in the liquid phase having soaked from the reservoir 62 in the −Y direction due to a capillary force. In other words, the wick 64A transports the working fluid in the liquid phase retained in the reservoir 62 toward the groove member 65. The wick 64A is formed of a metal material such as copper or stainless steel (SUS; Steel Use Stainless).

It should be noted that the configuration of the wick 64A will be described later in detail.

Configuration of Groove Member

As described above, the groove member 65 is integrated with the second housing 612. In other words, the groove member 65 is apart of the second housing 612. The groove member 65 has a coupling surface 651 which is a surface in the +Y direction side of the groove member 65, and is coupled to the wick 64A as the fluid transport layer.

Further, the groove member 65 has the plurality of flow channels VC each shaped like a groove through which the working fluid having changed in phase from the liquid phase to the gas phase flows. The flow channels VC are each a groove part recessed in the −Y direction from the coupling surface 651, extend along the +X direction, and are arranged along the +Z direction. The plurality of flow channels VC are communicated with the vapor pipe coupler 6121 to be coupled to the vapor pipe 52.

In the heat exchanger 63A, the working fluid in the liquid phase having been transported in the −Y direction by the wick 64A is evaporated with the heat of the light source 411 transferred from the second housing 612 to the groove member 65 to be changed to the vapor of the working fluid, namely the working fluid in the gas phase. The evaporation region of the working fluid in the liquid phase is the groove member 65 in some cases, or the wick 64A in other cases.

When the evaporation region is the groove member 65, the working fluid in the liquid phase having been transported to the surfaces of the plurality of flow channels VC by the wick 64A is evaporated with the heat having been transferred to the groove member 65.

When the evaporation region is the wick 64A, the working fluid in the liquid phase retained in the wick 64A is evaporated with the heat transferred from the groove member 65 to the wick 64A.

Then, the working fluid having been evaporated by the groove member 65 or the wick 64A to be changed in phase from the liquid phase to the gas phase flows through the plurality of flow channels VC and then inflows into the vapor pipe 52 communicated with the vapor pipe coupler 6121. As described above, the heat transfer is promoted by using the heat drawn from the light source 411 for the phase change of the working fluid from the liquid phase to the gas phase, and thus, the light source 411 is cooled.

Detailed Configuration of Wick

Figure 7:
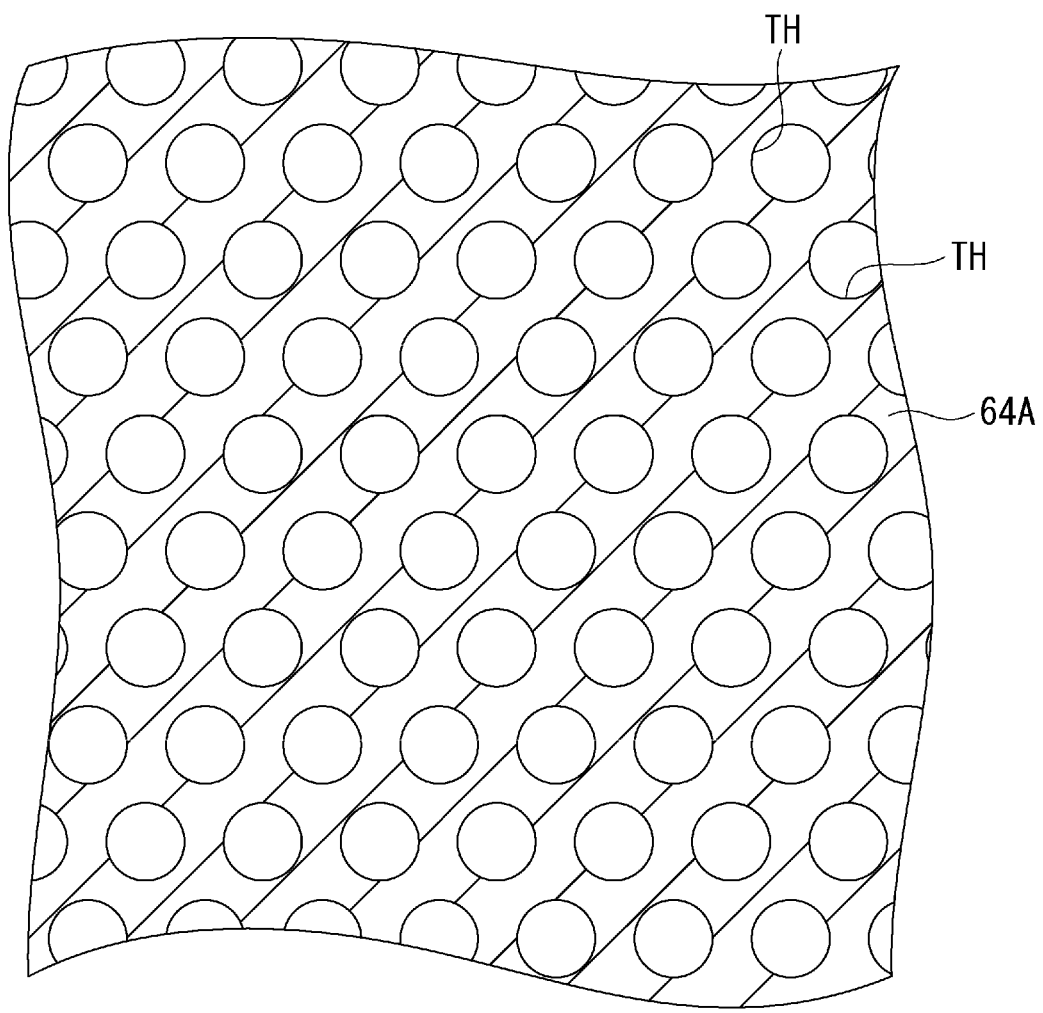
FIG. 7 is a plan view showing a part of a wick in the first embodiment in an enlarged manner.
Figure 8:
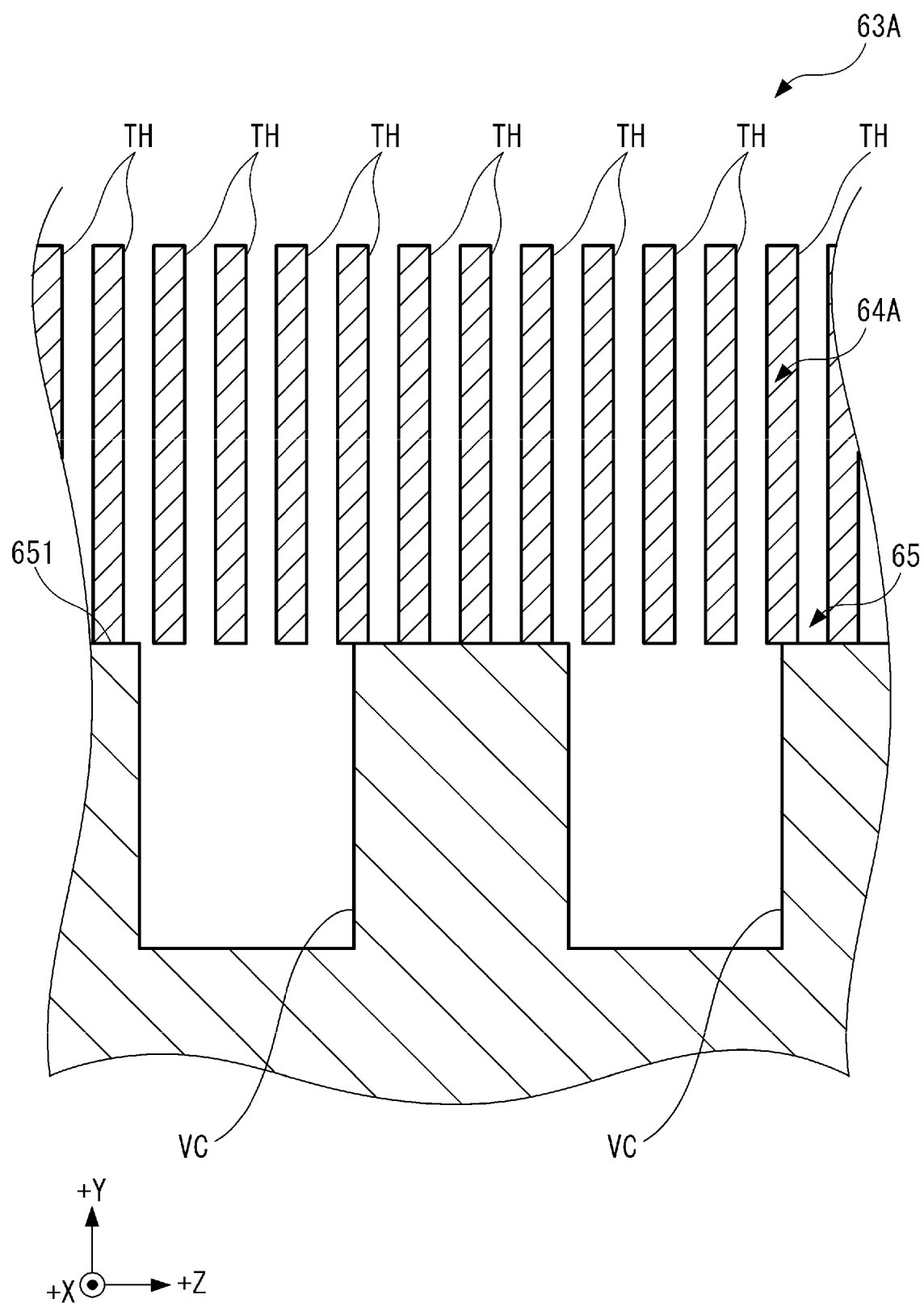
FIG. 8 is a diagram showing a part of a cross-sectional surface of a heat exchanger in the first embodiment in an enlarged manner.

FIG. 7 is a plan view showing, in an enlarged manner, a part of the wick 64A viewed from the +Y direction as the reservoir 62 side. FIG. 8 is a diagram showing a part of a cross-sectional surface along the Y-Z plane of the heat exchanger 63A in an enlarged manner. It should be noted that in FIG. 7, only some of the through holes TH are attached with the reference symbols taking eye-friendliness into consideration.

As shown in FIG. 7 and FIG. 8, the wick 64A as the fluid transport layer has the plurality of through holes TH penetrating the wick 64A along the −Y direction from the reservoir 62 toward the groove member 65. In other words, the wick 64A has the plurality of through holes TH penetrating the wick 64A along the −Y direction from the reservoir 62 toward the heat exchanger 63A.

Further, the region other than the plurality of through holes TH in the wick 64A is formed of the metal material described above in a solid manner. It should be noted that the surface on the +Y direction side of the wick 64A is coupled to the reservoir 62, and the surface on the −Y direction side has contact with the coupling surface 651 as the surface on the +Y direction side of the groove member 65 in the present embodiment. In other words, in the present embodiment, the wick 64A is disposed so as to have contact with the groove member 65.

As shown in FIG. 7, the plurality of through holes TH are arranged on the +X direction side and the +Z direction side when viewing the wick 64A from the +Y direction. Further, as shown in FIG. 8, the plurality of through holes TH open on the +Y direction side as the reservoir 62 side in the wick 64A, and open on the −Y direction side as the groove member 65 side in the wick 64A. Thus, the plurality of through holes TH transport the working fluid in the liquid phase retained in the reservoir 62 in the −Y direction as the first direction.

It should be noted that the through holes TH are each formed to have a circular shape viewed from the +Y direction, but can also be formed to have a polygonal shape. When the shape of the through hole TH is a circular shape, the flow resistance of the working fluid in the liquid phase flowing through the through hole TH can be reduced compared to when the shape is a polygonal shape.

Function of Wick

The wick 64A having the through holes TH in the present embodiment can reduce the pressure loss compared to a wick which is formed by sintering particles, and in which the flow channel of the working fluid in the liquid phase is formed of small holes (voids) included inside. Hereinafter, the pressure loss K in the wick described above formed by sintering the particles and the pressure loss K' in the wick 64A in the present disclosure are compared to each other. It should be noted that the pressure losses K, K' specifically represent coefficients of the respective pressure losses of the wick described above formed by sintering the particles and the wick 64A corresponding to the wick in the present disclosure, and are numerical values representing that the higher the values of K, K' are, the smaller the pressure loss becomes.

The pressure loss K of the wick described above formed by sintering the particles is expressed as the formula (1) below. The character ε in the formula (1) represents a void ratio of the wick. The characters $d_P$ in the formula (1) represent a void diameter of the wick. It should be noted that in the formula (1), it is assumed that it is true that the particles included in the wick each have a spherical shape, and the void diameter of the wick has a size 0.41 times as large as the diameter of the particle.

$$K = d_P^2 \varepsilon^3 / (150 * 0.41^2 (1-\varepsilon)^2) \quad (1)$$

In contrast, the pressure loss K' of the wick 64A is expressed as the formula (2) below. It should be noted that the character ε in the formula (2) represents a void ratio of the wick 64A, the characters $d_P$ represent a void diameter of the wick 64A, namely the diameter of the through hole TH.

$$K' = d_P^2 \varepsilon / 32 \quad (2)$$

Here, when adopting a typical void ratio of 0.4 in the wick described above obtained by sintering the particles each having a spherical shape as the void ratio in the formulas (1), (2), K'/K becomes about 1.8.

As described above, it is possible for the wick 64A to reduce the pressure loss to 1/1.8 times compared to the wick described above obtained by sintering the particles each having a spherical shape. In other words, according to the configuration of the wick 64A having the plurality of through holes TH, the pressure loss can be reduced compared to the wick obtained by sintering the particles each having a spherical shape.

Advantages of First Embodiment

According to the projector 1 related to the present embodiment described hereinabove, the following advantages can be exerted.

The projector 1 is provided with the light source device 4, the light modulators 343 (343B, 343G, and 343R), the projection optical device 36, and the cooling device 5, wherein the light source device 4 has the light source 411 for emitting the light, the light modulators 343 each modulate the light emitted from the light source device 4, the projection optical device 36 projects the light modulated by the light modulators 343, and the cooling target of the cooling device 5 is the light source 411. The cooling device 5 is provided with the loop heat pipe 51 having the evaporator 6A, the condenser 53, the vapor pipe 52, and the liquid pipe 54. The condenser 53 condenses the working fluid in the gas phase to change the working fluid in the gas phase to the working fluid in the liquid phase. The liquid pipe 54 makes the working fluid having changed in phase from the gas phase to the liquid phase in the condenser 53 flow into the evaporator 6A. The liquid pipe 52 makes the working fluid having changed in phase from the liquid phase to the gas phase in the evaporator 6A flow into the condenser 53.

The evaporator 6A evaporates the working fluid in the liquid phase with the heat transferred from the light source 411 to change the working fluid in the liquid phase to the working fluid in the gas phase, and has the housing 61, the reservoir 62, the wick 64A, and the groove member 65. The housing 61 is coupled to the liquid pipe 54, and the working fluid in the liquid phase inflows into the housing 61. The reservoir 62 is disposed inside the housing 61 to retain the working fluid in the liquid phase having flowed into the housing 61. The groove member 65 has the plurality of flow channels VC through which the working fluid having changed in phase from the liquid phase to the gas phase flows, and is coupled to the wick 64A.

The wick 64A is disposed inside the housing 61, soaked with the working fluid in the liquid phase, and transports the working fluid in the liquid phase. Such a wick 64A has the plurality of through holes TH penetrating the wick 64A along the −Y direction as the first direction from the reservoir 62 toward the groove member 65, and transporting the working fluid in the liquid phase retained in the reservoir 62 in the −Y direction.

In other words, the evaporator 6A of the cooling device 5 has the housing 61, the reservoir 62, and the heat exchanger 63A, wherein the housing 61 is coupled to the liquid pipe 54, the working fluid in the liquid phase inflows into the housing 61, the reservoir 62 is provided in the housing 61 and retains the working fluid in the liquid phase having flowed into the housing 61, and the heat exchanger 63A evaporates the working fluid in the liquid phase having been supplied from the reservoir 62. The heat exchanger 63A has the groove member 65 as the flow channel forming layer, and the wick 64A as the fluid transport layer disposed in sequence along the −Y direction as the first direction from the reservoir 62 toward the heat exchanger 63A. The groove member 65 has the plurality of flow channels VC, and is coupled to the wick 64A, wherein the working fluid having changed in phase from the liquid phase to the gas phase flows through the plurality of flow channels VC, and the plurality of flow channels VC are communicated with the vapor pipe 52. The wick 64A has the plurality of through holes TH penetrating the wick 64A along the +Y direction, and transporting the working fluid in the liquid phase retained in the reservoir 62 in the −Y direction.

According to such a configuration, since the plurality of through holes TH for transporting the working fluid in the liquid phase from the reservoir 62 toward the groove member 65 penetrate the wick 64A along the −Y direction from the reservoir 62 toward the groove member 65, it is possible to reduce the pressure loss compared to the wick obtained by sintering the particles as described above. Therefore, by adjusting the diameter and the density of the through holes TH, it is possible to achieve both of the increase in the maximum capillary force and the decrease in the pressure loss.

Thus, it is possible to efficiently transport the working fluid in the liquid phase toward the groove member 65 by the wick 64A. Therefore, it is possible to promote the phase change of the working fluid from the liquid phase to the gas phase due to the heat of the light source 411 to promote the heat transfer from the light source 411 to the housing 61. Therefore, it is possible to increase the cooling efficiency of the light source 411 as the cooling target.

Second Embodiment

Then, a second embodiment of the present disclosure will be described.

The projector according to the present embodiment is provided with substantially the same configuration as that of the projector 1 according to the first embodiment, but is different therefrom in the configuration of the wick constituting the fluid transport layer. It should be noted that in the following description, a part which is the same or substantially the same as the part having already been described is denoted by the same reference symbol, and the description thereof will be omitted.

Configuration of Projector

Figure 9:
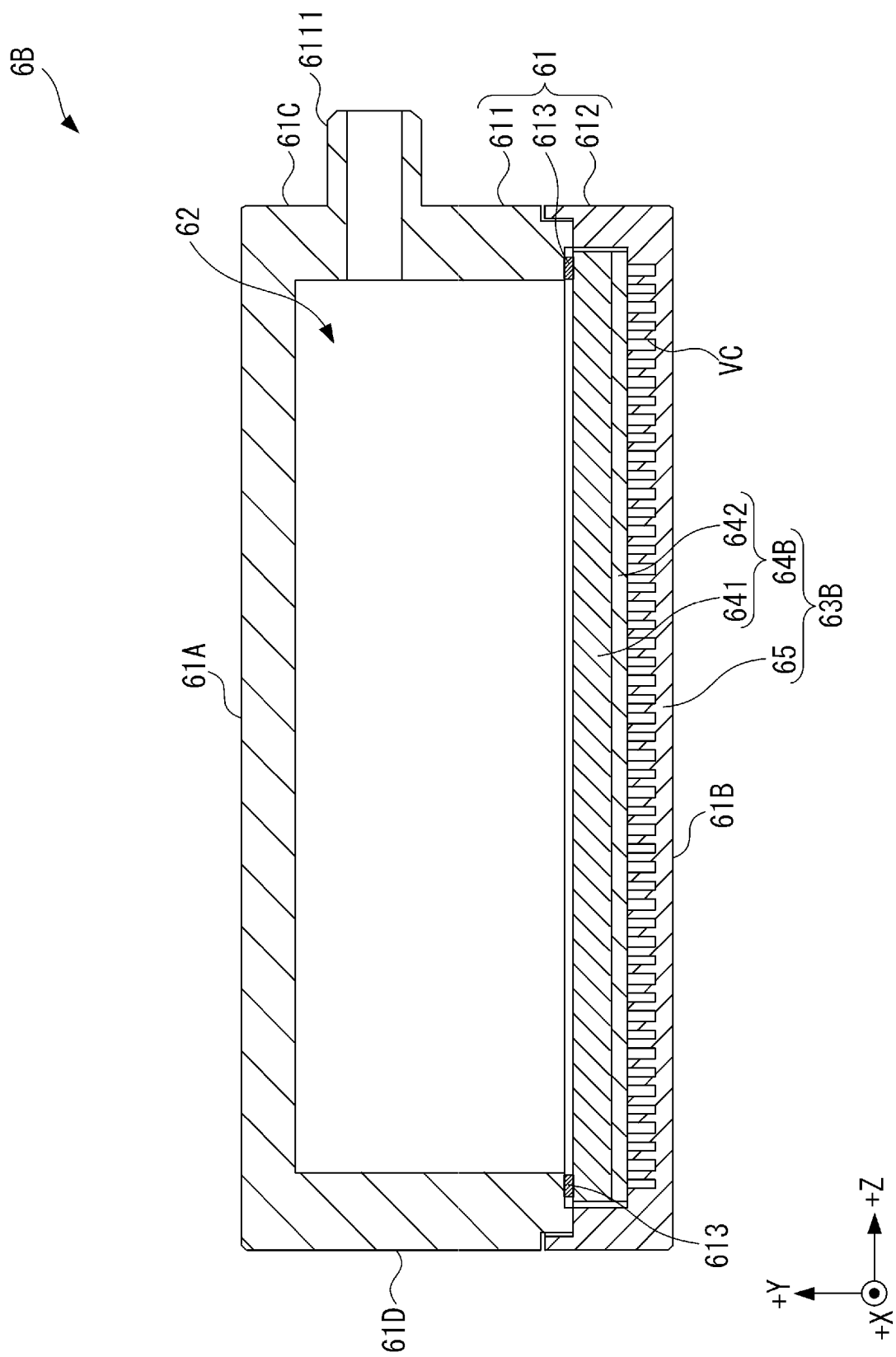
FIG. 9 is a cross-sectional view schematically showing an internal structure of an evaporator provided to a projector according to a second embodiment.

FIG. 9 is a cross-sectional view schematically showing an internal configuration of an evaporator 6B provided to the projector according to the present embodiment. Specifically, FIG. 9 is a diagram showing a cross-sectional surface of the evaporator 6B including an imaginary line set at substantially the same position as that of the imaginary line VL1 described above.

The projector according to the present embodiment has substantially the same configuration and functions as those of the projector 1 according to the first embodiment except the point that the evaporator 6B shown in FIG. 9 is provided instead of the evaporator 6A. In other words, the cooling device 5 related to the present embodiment is provided with the evaporator 6B instead of the evaporator 6A, and takes the light source 411 as the cooling target.

Configuration of Evaporator

As shown in FIG. 9, the evaporator 6B has substantially the same configuration and functions as those of the evaporator 6A except the point that a heat exchanger 63B is provided instead of the heat exchanger 63A. Further, the heat exchanger 63B has substantially the same configuration and functions as those of the heat exchanger 63A except the fact that a wick 64B as the fluid transport layer is provided instead of the wick 64A. In other words, the heat exchanger 63B has the wick 64B as the fluid transport layer and the groove member 65 as the flow channel forming layer disposed in sequence along the −Y direction as the first direction from the reservoir 62 toward the heat exchanger 63B.

Configuration of Wick

The wick 64B is disposed between the reservoir 62 and the groove member 65 similarly to the wick 64A. The wick 64B is soaked with the working fluid in the liquid phase retained in the reservoir 62 to transport the working fluid in the liquid phase toward the groove member 65.

The wick 64B has a plurality of layers. In the present embodiment, the wick 64B as the fluid transport layer has a first layer 641 and a second layer 642.

Configuration of First Layer

Figure 10:
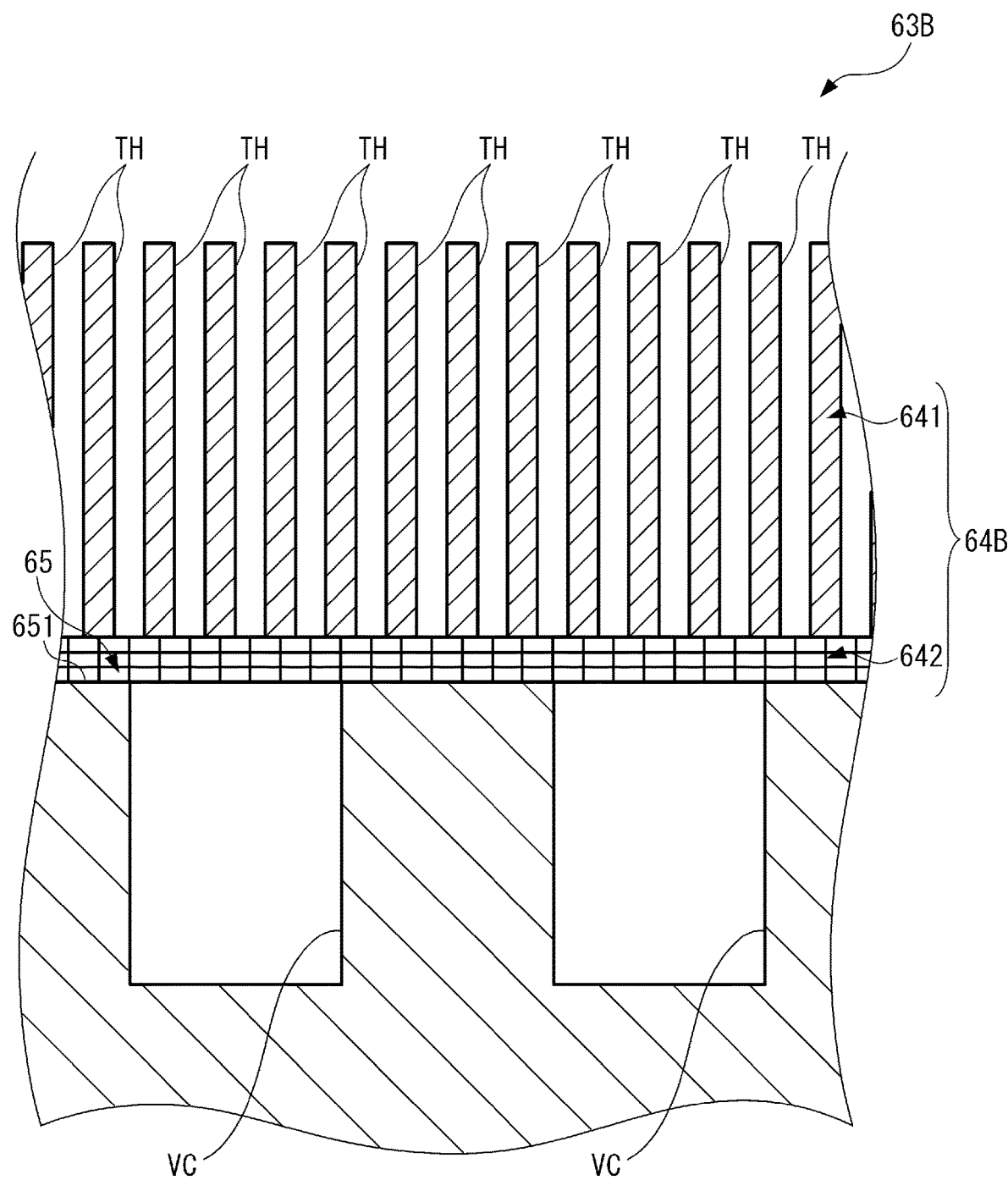
FIG. 10 is a diagram showing a part of a cross-sectional surface of a heat exchanger in the second embodiment in an enlarged manner.

FIG. 10 is a diagram showing a part of a cross-sectional surface along the Y-Z plane of the heat exchanger 63B in an enlarged manner.

The first layer 641 is located on the +Y direction side with respect to the second layer 642 to be coupled to the reservoir 62. The first layer 641 is formed of a metal material such as copper or stainless steel similarly to the wick 64A, and has substantially the same configuration as that of the wick 64A.

In other words, the first layer 641 has the plurality of through holes TH arranged in the +X direction and the +Z direction, and penetrating the first layer 641 along the −Y direction as shown in FIG. 10. Further, similarly to the wick 64A, due to the capillary force, the first layer 641 transports the working fluid in the liquid phase having flowed into the plurality of through holes TH toward the second layer 642.

It should be noted that the region other than the plurality of through holes TH in the first layer 641 is formed of the metal material described above in a solid manner. It should be noted that the surface on the +Y direction side of the first layer 641 is coupled to the reservoir 62, and the surface on the −Y direction side has contact with the second layer 642.

Configuration of Second Layer

As shown in FIG. 9 and FIG. 10, the second layer 642 is disposed between the first layer 641 and the groove member 65 as the flow channel forming layer. The surface on the +Y direction side of the second layer 642 has contact with the first layer 641, and the surface on the −Y direction side has contact with the coupling surface 651 of the groove member 65. In other words, in the present embodiment, the wick 64B is disposed so as to have contact with the groove member 65.

The second layer 642 has a higher void ratio than the void ratio of the first layer 641. In other words, the void ratio of the second layer 642 is higher than the void ratio of the first layer 641. Therefore, the working fluid in the liquid phase having flowed through the through holes TH of the first layer 641 in the −Y direction easily inflows into the second layer 642, and is transported to the groove member 65 via the second layer 642.

In the present embodiment, the second layer 642 has a configuration obtained by stacking a plurality of layers on one another, wherein the plurality of layers are each a mesh-like layer formed by interweaving wire rods formed of metal having higher thermal conductivity than the thermal conductivity of the metal constituting the first layer 641. Thus, the thermal conductivity of the second layer 642 is higher than the thermal conductivity of the first layer 641. Therefore, it is possible to efficiently transfer the heat from the groove member 65 to the second layer 642, and it is possible to promote the phase change of the working fluid from the liquid phase to the gas phase in the second layer 642, namely the evaporation of the working fluid in the liquid phase. Besides the above, the void ratio of the second layer 642 can be made higher than the void ratio of the first layer 641.

It should be noted that the wire rods constituting the second layer 642 can also be formed of the same metal as that of the first layer 641. In this case, it is possible to suppress the deterioration of the first layer 641 and the second layer 642 due to electromigration. Further, it is also possible to adopt a porous body having a higher void ratio than the void ratio of the first layer 641 as the second layer 642.

Function of Second Layer

Since the wick 64B is provided with the second layer 642, the through holes TH opposed to the coupling surface 651 of the groove member 65 are not blocked by the coupling surface 651 out of the plurality of through holes TH provided to the first layer 641. The working fluid in the liquid phase having flowed in the −Y direction through the through holes TH opposed to the coupling surface 651 inflows into the corresponding flow channels VC via the second layer 642 having a higher void ratio than the void ratio of the first layer 641.

Further, since the through holes TH opening in the flow channels VC as groove parts recessed in the −Y direction from the coupling surface 651 out of the plurality of through holes TH are not blocked by the coupling surface 651, the working fluid in the liquid phase having flowed in the −Y direction through the through holes TH inflows into the corresponding flow channels VC.

Figure 11:
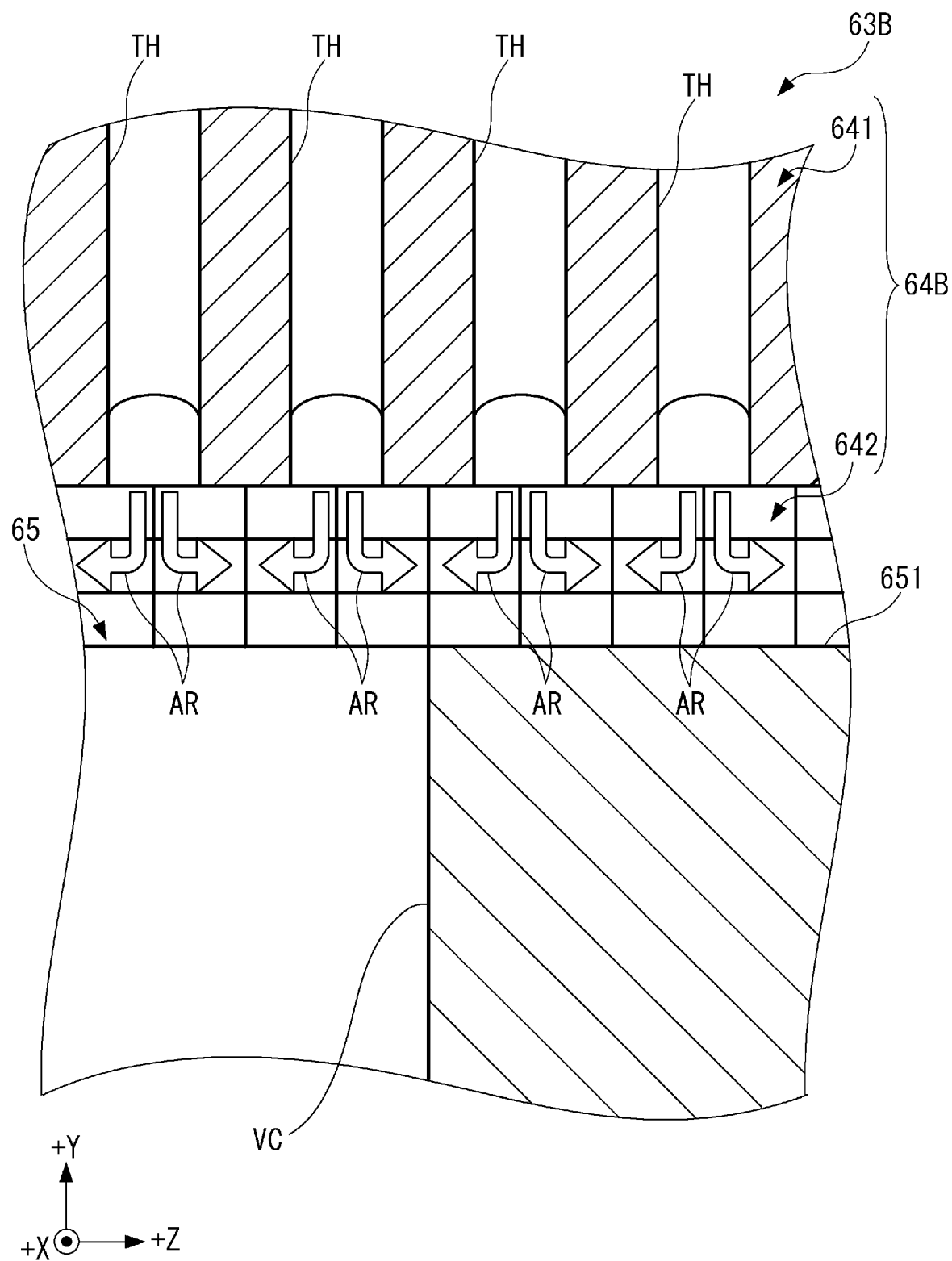
FIG. 11 is a schematic diagram for explaining the state in which a working fluid in the liquid phase having flowed through through holes in the second embodiment inflows into a second layer.

FIG. 11 is a schematic diagram for explaining the state in which the working fluid in the liquid phase having flowed in the −Y direction through the through holes TH of the first layer 641 inflows into the second layer 642.

In contrast, the wick 64B has the second layer 642 disposed between the first layer 641 and the coupling surface 651 of the groove member 65 in addition to the first layer 641, and the void ratio of the second layer 642 is higher than the void ratio of the first layer 641.

According to this configuration, as represented by the arrow AR in FIG. 11, the working fluid in the liquid phase having flowed in the −Y direction through the plurality of through holes TH flows out to the inside of the voids of the second layer 642, and is then supplied to the plurality of flow channels VC in the groove member 65. Therefore, it is possible to prevent some of the through holes TH from being blocked by the coupling surface 651, and it is possible to efficiently transport the working fluid in the liquid phase toward the groove member 65 with the wick 64B.

It should be noted that even when the working fluid changes in phase from the liquid phase to the gas phase inside the through holes TH, the working fluid in the gas phase thus generated can be made to flow into the flow channels VC via the second layer 642.

Advantages of Second Embodiment

According to the projector related to the present embodiment described hereinabove, in addition to the advantages substantially the same as those of the projector 1 according to the first embodiment, the following advantages can be obtained.

The wick 64B as the fluid transport layer has the first layer 641 having the plurality of through holes TH, and the second layer 642 located between the first layer 641 and the coupling surface 651 of the groove member 65. The void ratio of the second layer 642 is higher than the void ratio of the first layer 641.

According to such a configuration, as described above, it is possible to prevent some of the through holes TH from being blocked by the coupling surface 651. Therefore, it is possible to efficiently transport the working fluid in the liquid phase toward the groove member 65 by the wick 64B as the fluid transport layer. Therefore, since it is possible to promote the phase change of the working fluid from the liquid phase to the gas phase with the heat of the light source 411 as the cooling target, it is possible to increase the cooling efficiency of the light source 411.

It should be noted that even when the phase change of the working fluid from the liquid phase to the gas phase occurs inside the through holes TH as described above, it is possible to increase the discharge efficiency of the working fluid in the gas phase from the through holes TH to the flow channels VC. Therefore, even in this case, since the phase change of the working fluid with the heat of the light source 411 can be promoted, the cooling efficiency of the light source 411 can be increased.

The thermal conductivity of the second layer 642 is higher than the thermal conductivity of the first layer 641.

According to this configuration, as described above, it is possible to efficiently transfer the heat from the groove member 65 to the second layer 642. Therefore, since it is possible to promote the phase change of the working fluid from the liquid phase to the gas phase, namely the evaporation of the working fluid in the liquid phase, in the second layer 642, it is possible to increase the cooling efficiency of the light source 411.

Third Embodiment

Then, a third embodiment of the present disclosure will be described.

A projector according to the present embodiment is provided with substantially the same configuration as that of the projector 1 according to the first embodiment, but is different therefrom in the point that the heat exchanger has a protruding part for forming a gap for allowing the through holes of the wick and the flow channels of the groove member to be communicated with each other. It should be noted that in the following description, a part which is the same or substantially the same as the part having already been described is denoted by the same reference symbol, and the description thereof will be omitted.

Figure 12:
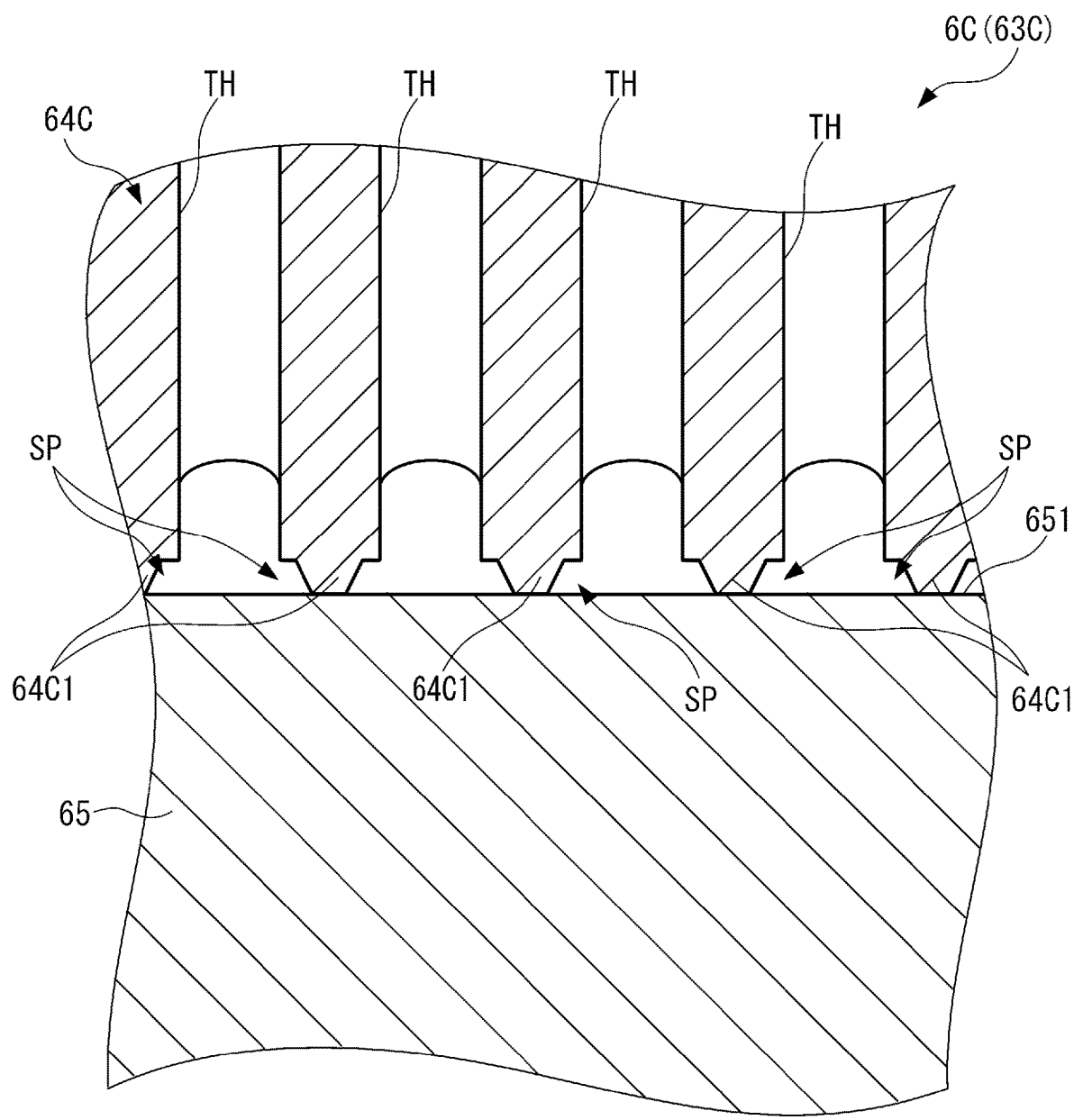
FIG. 12 is a schematic diagram showing a part of a cross-sectional surface of a heat exchanger included in an evaporator provided to a projector according to a third embodiment in an enlarged manner.

FIG. 12 is a schematic diagram showing a part of the cross-sectional surface along the X-Y plane of a heat exchanger 63C of an evaporator 6C provided to the projector according to the present embodiment in an enlarged manner.

The projector according to the present embodiment has substantially the same configuration and functions as those of the projector 1 according to the first embodiment except the point that the heat exchanger 63C shown in FIG. 12 is provided instead of the heat exchanger 63A. In other words, the cooling device 5 according to the present embodiment is provided with the evaporator 6C having the heat exchanger 63C instead of the heat exchanger 63A, and takes the light source 411 as the cooling target.

The heat exchanger 63C has substantially the same configuration and functions as those of the heat exchanger 63A except the fact that a wick 64C as the fluid transport layer is provided instead of the wick 64A. In other words, the heat exchanger 63C has the wick 64C as the fluid transport layer and the groove member 65 as the flow channel forming layer disposed in sequence along the −Y direction as the first direction from the reservoir 62 toward the heat exchanger 63C.

The wick 64C is disposed between the reservoir 62 and the groove member 65 similarly to the wick 64A. The wick 64C is soaked with the working fluid in the liquid phase retained in the reservoir 62 to transport the working fluid in the liquid phase toward the groove member 65. The wick 64C is formed of substantially the same metal material as that of the wick 64A similarly to the wick 64A. For example, the wick 64C has the plurality of through holes TH penetrating the wick 64C along the −Y direction similarly to the wick 64A. Further, the wick 64C as the fluid transport layer is disposed so as to have contact with the groove member 65 as the flow channel forming layer.

Besides the above, the wick 64C further includes a plurality of protruding parts 64C1 which are disposed in an area other than the through holes TH in the surface on the −Y direction side, and protrude in the −Y direction.

When the wick 64C and the groove member 65 are combined with each other, the plurality of protruding parts 64C1 have contact with the coupling surface 651 of the groove member 65 to form gaps SP between the wick 64C and the coupling surface 651. In other words, the plurality of protruding parts 64C1 have contact with the coupling surface 651 to form the gaps SP for communicating the plurality of through holes TH of the wick 64C and the plurality of flow channels VC of the groove member 65 with each other.

The working fluid in the liquid phase having flowed in the −Y direction through the through holes TH inflows into the flow channels VC via the gaps SP formed in such a manner. Thus, it is possible to make the working fluid in the liquid phase flow from the through holes TH into the flow channels VC while preventing the through holes TH from being blocked by the coupling surface 651.

It should be noted that even when the working fluid changes in phase from the liquid phase to the gas phase inside the through holes TH, the working fluid in the gas phase thus generated can be made to flow into the flow channels VC via the gaps SP formed by the protruding parts 64C1.

Advantages of Third Embodiment

According to the projector related to the present embodiment described hereinabove, in addition to the advantages substantially the same as those of the projector 1 according to the first embodiment, the following advantages can be obtained.

Out of the wick 64C as the fluid transport layer and the groove member 65 as the flow channel forming layer, the wick 64C as one layer and one member has the protruding parts 64C1 which form the gaps SP for communicating the plurality of through holes TH and the plurality of flow channels VC with each other with the coupling surface 651 of the groove member 65 as the other layer and the other member when the wick 64C and the groove member 65 have contact with each other.

According to such a configuration, it is possible to prevent that the through holes TH are blocked and working fluid in the liquid phase having flowed through the through holes TH, or the working fluid having changed in phase from the liquid phase to the gas phase in the through holes TH fails to flow into the flow channels VC similarly to when the heat exchanger 63B has the second layer 642. Therefore, since it is possible to efficiently guide the working fluid in the liquid phase or the working fluid in the gas phase to the flow channels VC, it is possible to increase the cooling efficiency of the light source 411 as the cooling target.

Modifications of Third Embodiment

Figure 13:
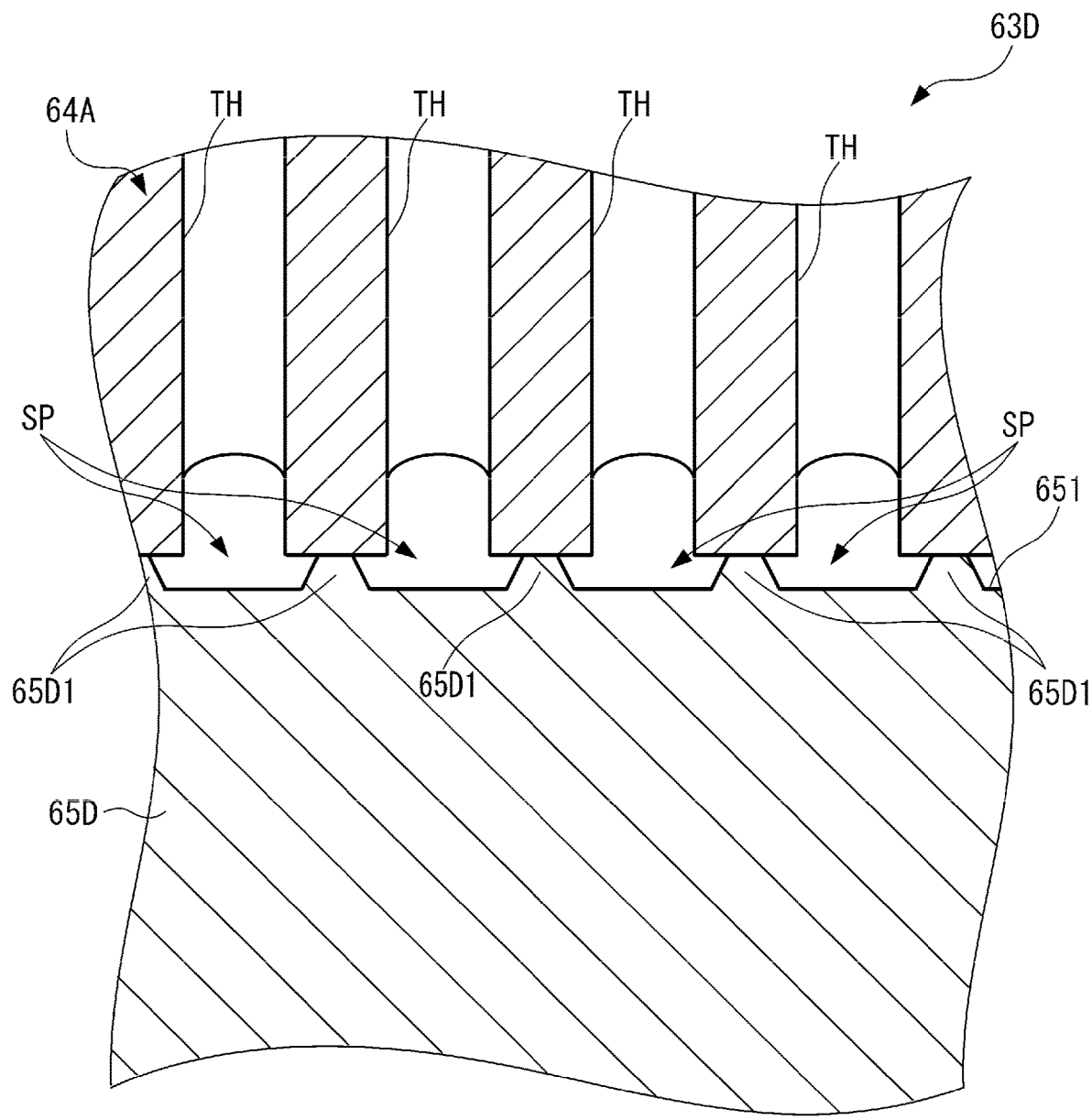
FIG. 13 is a schematic diagram showing a part of a cross-sectional surface of a heat exchanger in a modification of the third embodiment in an enlarged manner.

FIG. 13 is a diagram showing a part of a cross-sectional surface along the Y-Z plane of a heat exchanger 63D as a modification of the heat exchanger 63C.

It is assumed that in the heat exchanger 63C in the present embodiment, the wick 64C as the fluid transport layer has the protruding parts 64C1 for forming the gaps SP for communicating the through holes TH and the flow channels VC with each other. However, this is not a limitation, it is also possible for the groove member to have protruding parts for forming the gaps SP.

For example, it is also possible for the evaporator 6C to be provided with the heat exchanger 63D shown in FIG. 13 instead of the heat exchanger 63C.

As shown in FIG. 13, the heat exchanger 63D has substantially the same configuration and functions as those of the heat exchanger 63A in the first embodiment except the point that a groove member 65D is provided instead of the groove member 65. In other words, the heat exchanger 63D has the wick 64A as the fluid transport layer, and the groove member 65D as the flow channel forming layer. Further, the wick 64A is disposed so as to have contact with the groove member 65D. It should be noted that as described above, the wick 64A is coupled to the reservoir 62, and transports the working fluid in the liquid phase retained in the reservoir 62 in the −Y direction as the groove member 65D side with the plurality of through holes TH.

The groove member 65D has the plurality of flow channels VC through which the working fluid in the gas phase flows, and which is communicated with the vapor pipe coupler 6121 similarly to the groove member 65. Besides the above, the groove member 65D has a plurality of protruding parts 65D1 coupled to the wick 64A, and protruding in the +Y direction from the coupling surface 651 as the surface on the +Y direction side.

In other words, out of the wick 64A as the fluid transport layer and the groove member 65D as the flow channel forming layer, the groove member 65D as one layer and one member has the protruding parts 65D1 which form the gaps SP for communicating the plurality of through holes TH and the plurality of flow channels VC with each other with wick 64A as the other layer and the other member when the wick 64A and the groove member 65D have contact with each other.

The plurality of protruding parts 65D1 have contact with an area other than the plurality of through holes TH in the surface on the −Y direction side of the wick 64A to form the gaps SP for communicating the plurality of through holes TH and the plurality of flow channels VC with each other when the wick 64A and the groove member 65D are combined with each other.

According to the cooling device 5 and the projector provided with the evaporator 6C having such a heat exchanger 63D instead of the heat exchanger 63C, it is possible to exert substantially the same advantages as those of the cooling device 5 and the projector provided with the evaporator 6C having the heat exchanger 63C.

Modifications of Embodiments

The present disclosure is not limited to each of the embodiments described above, but includes modifications, improvements, and so on within the range in which the advantages of the present disclosure can be achieved.

In each of the embodiments described above, it is assumed that the plurality of through holes TH provided to the wicks 64A through 64C as the fluid transport layer are arranged in the +X direction and the +Z direction. However, this is not a limitation, but it is also possible for the through holes TH to be disposed in the wick in a random manner. Further, the diameter of the through hole TH can be the same, or can also be different between the through holes TH.

In the second embodiment, it is assumed that the wick 64B as the fluid transport layer has the first layer 641 and the second layer 642. However, this is not a limitation, and it is also possible for the wick 64B to be provided with a third layer disposed between the first layer 641 and the second layer 642. In this case, when the void ratio of the third layer is higher than the void ratio of the first layer 641, and equal to or lower than the void ratio of the second layer 642, it is possible to make the working fluid in the liquid phase easy to flow toward the groove member 65, and at the same time, it is possible to prevent the working fluid in the gas phase from flowing back toward the reservoir 62.

In the third embodiment described above, it is assumed that the protruding parts 64C1 provided to the wick 64C are each disposed between the through holes TH adjacent to each other. In the modification of the third embodiment described above, it is assumed that the protruding parts 65D1 provided to the groove member 65D are each disposed so as to have contact with an area between the through holes TH adjacent to each other in the surface on the −Y direction side of the wick 64A. In other words, it is assumed that the protruding parts 65D1 are each disposed so as to correspond to an area between the through holes TH adjacent to each other in the surface on the −Y direction side of the wick 64A. However, this is not a limitation, and the density at which the protruding parts 64C1 are formed on the surface on the −Y direction side of the wick 64C, and the density at which the protruding parts 65D1 are formed on the plurality of coupling surfaces 651 as the surfaces on the +Y direction side of the groove member 65D can arbitrarily be changed. In other words, providing the gaps SP for communicating the through holes TH and the flow channels VC with each other can be formed, the positions of the protruding parts for forming the gaps SP can arbitrarily be changed.

Further, the protruding parts 64C1 are not required to be integrated with the wick 64C, and the protruding parts 65D1 are not required to be integrated with the groove member 65D. In other words, it is also possible to dispose a spacer functioning as the protruding part for forming the gap SP between the wick and the groove member.

Further, it is also possible for the gaps SP formed by the protruding parts 64C1, 64D1 to be formed to have groove shapes for communicating the through holes TH and the flow channels VC with each other.

In each of the embodiments described above, it is assumed that the groove member 65, 65D is integrated with the second housing 612 constituting the housing 61. However, this is not a limitation, and it is also possible for the groove member and the second housing to be separated from each other. In this case, it is sufficient for the wick and the groove member to be disposed inside the second housing.

In each of the embodiments described above, it is assumed that the light source 411 of the light source device 4 has the semiconductor lasers 412, 413. However, this is not a limitation, and it is also possible for the light source device to be a device having a light source lamp such as a super-high pressure mercury lamp, or other solid-state light sources such as light emitting diodes (LED) as the light source. In this case, the cooling target of the loop heat pipe 51 can also be the light source lamp or other solid-state light sources.

Further, the cooling target of the cooling device 5 is not limited to the light source 411, but can also be other constituents. For example, it is also possible for the cooling device 5 to be a device for cooling an optical component such as light modulators 343 or the polarization conversion elements 313, or a device for cooling a circuit element provided to the control device or the power supply device.

In each of the embodiments described above, it is assumed that the projector is equipped with the three light modulators 343 (343B, 343G and 343R). However, this is not a limitation, and the present disclosure can also be applied to a projector equipped with two or less, or four or more light modulators.

In each of the embodiments described above, it is assumed that the light modulators 343 are each the transmissive type liquid crystal panel having the plane of incidence of light and the light exit surface different from each other. However, this is not a limitation, and it is also possible to use reflective liquid crystal panels having the plane of incidence of light and the light exit surface coinciding with each other as the light modulators. Further, it is also possible to use a light modulator other than the liquid crystal device such as a device using a micromirror such as a digital micromirror device (DMD) providing the light modulator is capable of modulating the incident light beam to form the image corresponding to the image information.

In each of the embodiments described above, there is cited an example of applying the cooling device 5 equipped with the loop heat pipe 51 to the projector. However, this is not a limitation, and the cooling device according to the present disclosure can also be applied to other devices or equipment than the projector, and in addition, can also be used alone. In other words, the application of the cooling device according to the present disclosure is not limited to a device for cooling the constituents of the projector.

What is claimed is:

1. A cooling device comprising:
an evaporator configured to evaporate a working fluid in a liquid phase with a heat transferred from a cooling target to change the working fluid in the liquid phase to the working fluid in a gas phase;
a condenser configured to condense the working fluid in the gas phase to change the working fluid in the gas phase to the working fluid in the liquid phase;
a vapor pipe configured to circulate the working fluid changed in phase from the liquid phase to the gas phase in the evaporator into the condenser; and
a liquid pipe configured to circulate the working fluid changed in phase from the gas phase to the liquid phase in the condenser flow into the evaporator, wherein:
the evaporator includes
a housing coupled to the liquid pipe, and having a reservoir configured to retain the working fluid in the liquid phase flowed inside,
a wick disposed in the housing, soaked with the working fluid in the liquid phase, and configured to transport the working fluid in the liquid phase, and
a groove member having a plurality of flow channels through which the working fluid changed in phase from the liquid phase to the gas phase flows, the groove member being coupled to the wick,
the wick has a plurality of through holes penetrating the wick along a first direction from the reservoir toward the groove member, the through holes being configured to transport the working fluid in the liquid phase retained in the reservoir in the first direction,
the wick is disposed so as to have contact with the groove member, and
one of the wick and the groove member has a protruding part configured to form a gap with another of the wick and the groove member, the gap being configured to communicate the plurality of through holes and the plurality of flow channels with each other.

2. The cooling device according to claim 1, wherein:
the wick includes
a first layer having the plurality of through holes, and
a second layer located between the first layer and the groove member, and
a void ratio of the second layer is higher than a void ratio of the first layer.

3. The cooling device according to claim 2, wherein a thermal conductivity of the second layer is higher than a thermal conductivity of the first layer.

4. A projector comprising:
a light source configured to emit light;
a light modulator configured to modulate the light emitted from the light source;
a projection optical device configured to project the light modulated by the light modulator; and
the cooling device according to claim 1.

5. The projector according to claim 4, wherein the cooling target is the light source.

6. A cooling device comprising:
an evaporator configured to evaporate a working fluid in a liquid phase with a heat transferred from a cooling target to change the working fluid in the liquid phase to the working fluid in a gas phase;
a condenser configured to condense the working fluid in the gas phase to change the working fluid in the gas phase to the working fluid in the liquid phase;
a vapor pipe configured to circulate the working fluid changed in phase from the liquid phase to the gas phase in the evaporator into the condenser; and
a liquid pipe configured to circulate the working fluid changed in phase from the gas phase to the liquid phase in the condenser flow into the evaporator, wherein:
the evaporator includes
a housing coupled to the liquid pipe, and having a reservoir configured to retain the working fluid in the liquid phase flowed inside, and
a heat exchanger configured to evaporate the working fluid in the liquid phase supplied from the reservoir, the heat exchanger has a fluid transport layer and a flow channel forming layer disposed in sequence along a first direction from the reservoir toward the heat exchanger, the flow channel forming layer coupled to the fluid transport layer, and having a plurality of flow channels through which the working fluid changed in phase from the liquid phase to the gas phase flows, the plurality of flow channels being communicated with the vapor pipe, the fluid transport layer has a plurality of through holes penetrating the fluid transport layer along the first direction and transporting the working fluid in the liquid phase retained in the reservoir in the first direction, the fluid transport layer is disposed so as to have contact with the flow channel forming layer, and one of the fluid transport layer and the flow channel forming layer has a protruding part configured to form a gap with another of the fluid transport layer and the flow channel forming layer, the gap being configured to communicate the plurality of through holes and the plurality of flow channels with each other.

7. The cooling device according to claim 6, wherein:
the fluid transport layer includes
a first layer having the plurality of through holes, and
a second layer located between the first layer and the flow channel forming layer, and
a void ratio of the second layer is higher than a void ratio of the first layer.

8. The cooling device according to claim 7, wherein a thermal conductivity of the second layer is higher than a thermal conductivity of the first layer.

9. A projector comprising:
a light source configured to emit light;
a light modulator configured to modulate the light emitted from the light source;
a projection optical device configured to project the light modulated by the light modulator; and
the cooling device according device according to claim 6.

10. The projector according to claim 9, wherein the cooling target is the light source.

\* \* \* \* \*